United States Patent
Kimura

(10) Patent No.: US 9,184,825 B2
(45) Date of Patent: Nov. 10, 2015

(54) RELAY STATION, RELAY METHOD, RADIO COMMUNICATION SYSTEM, AND RADIO COMMUNICATION APPARATUS

(75) Inventor: Ryota Kimura, Tokyo (JP)

(73) Assignee: Sony Corporation, Tokyo (JP)

( * ) Notice: Subject to any disclaimer, the term of this patent is extended or adjusted under 35 U.S.C. 154(b) by 149 days.

(21) Appl. No.: 13/497,945

(22) PCT Filed: Sep. 21, 2010

(86) PCT No.: PCT/JP2010/005715
§ 371 (c)(1),
(2), (4) Date: Mar. 23, 2012

(87) PCT Pub. No.: WO2011/039970
PCT Pub. Date: Apr. 7, 2011

(65) Prior Publication Data
US 2012/0176962 A1     Jul. 12, 2012

(30) Foreign Application Priority Data

Oct. 1, 2009     (JP) .................................. 2009-229480

(51) Int. Cl.
*H04B 7/14*          (2006.01)
*H04B 7/155*         (2006.01)
(Continued)

(52) U.S. Cl.
CPC .............. *H04B 7/155* (2013.01); *H04L 1/0003* (2013.01); *H04L 27/0008* (2013.01);
(Continued)

(58) Field of Classification Search
CPC ...................... H04L 1/0003; H04L 2001/0097
USPC ......................................................... 370/315
See application file for complete search history.

(56) References Cited

U.S. PATENT DOCUMENTS

2008/0232296 A1*   9/2008   Shin et al. ...................... 370/315
2009/0029645 A1*   1/2009   Leroudier ......................... 455/7
(Continued)

FOREIGN PATENT DOCUMENTS

CN          101151825 A        3/2008
EP            1852986 A1      11/2007
(Continued)

OTHER PUBLICATIONS

International Search Report Issued Dec. 7, 2010 in PCT/JP10/05715 Filed Sep. 21, 2010.

(Continued)

*Primary Examiner* — Dang Ton
*Assistant Examiner* — Nourali Mansoury
(74) *Attorney, Agent, or Firm* — Sony Corporation

(57) ABSTRACT

A relay node in a mobile communication network for relaying communications between a base station and a mobile terminal The relay node includes a first communication unit that communicates with the base station via a backhaul link using at least one of a first modulation method and a first multiplexing method, and a second communication unit that communicates with the mobile terminal via an access link using at least one of a second modulation method and a second multiplexing method. The relay node also includes a communication control unit that selects the at least one of the first modulation method and the first multiplexing method, or selects the at least one of the second modulation method and the second multiplexing method based on a characteristic of a link, a type of link or a type of data included in a communication signal.

9 Claims, 19 Drawing Sheets

(51) Int. Cl.
*H04L 1/00* (2006.01)
*H04L 27/00* (2006.01)
*H04W 52/02* (2009.01)
*H04L 5/00* (2006.01)
*H04W 16/26* (2009.01)
*H04W 84/04* (2009.01)

(52) U.S. Cl.
CPC ........ *H04W 52/0206* (2013.01); *H04L 5/0007* (2013.01); *H04L 2001/0097* (2013.01); *H04W 16/26* (2013.01); *H04W 84/045* (2013.01); *H04W 84/047* (2013.01)

(56) References Cited

U.S. PATENT DOCUMENTS

| | | | |
|---|---|---|---|
| 2009/0197603 A1* | 8/2009 | Ji et al. | 455/436 |
| 2010/0077274 A1* | 3/2010 | Kim et al. | 714/750 |
| 2011/0228731 A1* | 9/2011 | Luo et al. | 370/329 |
| 2012/0147810 A1* | 6/2012 | Wang et al. | 370/315 |

FOREIGN PATENT DOCUMENTS

| | | |
|---|---|---|
| EP | 1863200 A1 | 12/2007 |
| EP | 2461508 A1 | 6/2012 |
| JP | 11-331063 A | 11/1999 |
| JP | 2006 35902 | 2/2006 |
| JP | 2007 60212 | 3/2007 |
| JP | 2008 211345 | 9/2008 |
| JP | 2009-515487 A | 4/2009 |
| WO | WO 98/32244 A2 | 7/1998 |
| WO | WO 01/11797 A1 | 2/2001 |
| WO | 2006 035902 | 4/2006 |
| WO | WO 2008/050425 A1 | 5/2008 |
| WO | WO2009/150991 A1 | 12/2009 |
| WO | WO 2009/150991 A1 | 12/2009 |
| WO | WO 2010/002100 A2 | 1/2010 |

OTHER PUBLICATIONS

Office Action issued Oct. 29, 2013 in Japanese Patent Application No. 2009-229480.

U.S. Appl. No. 13/394,726, filed Mar. 9, 2012, Kimura.

Combined Chinese Office Action and Search Report issued Jan. 6, 2014 in Patent Application No. 201080044603.1 (with English language translation).

Extended European Search Report mailed May 30, 2014, in European Patent Application No. 10820096.5.

* cited by examiner

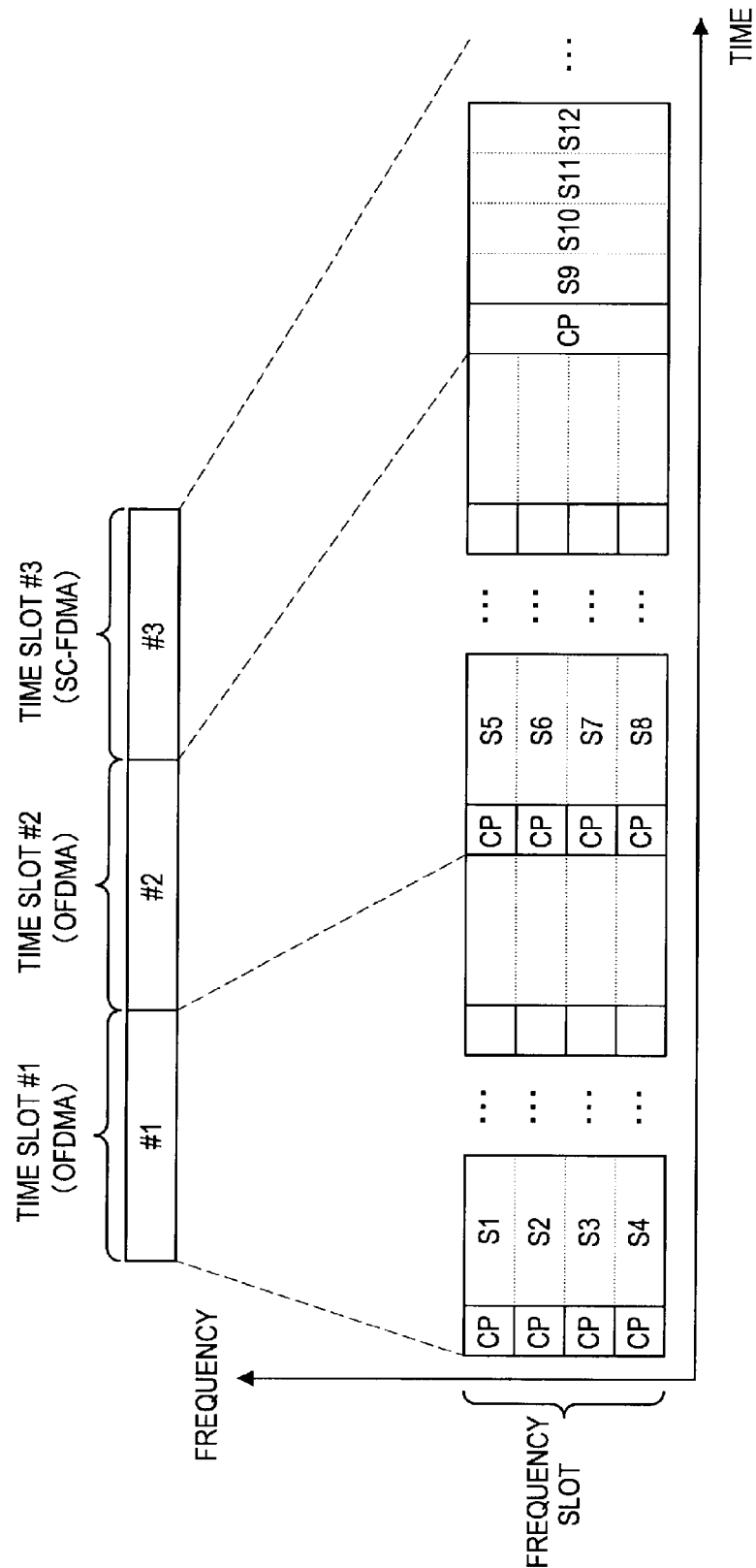

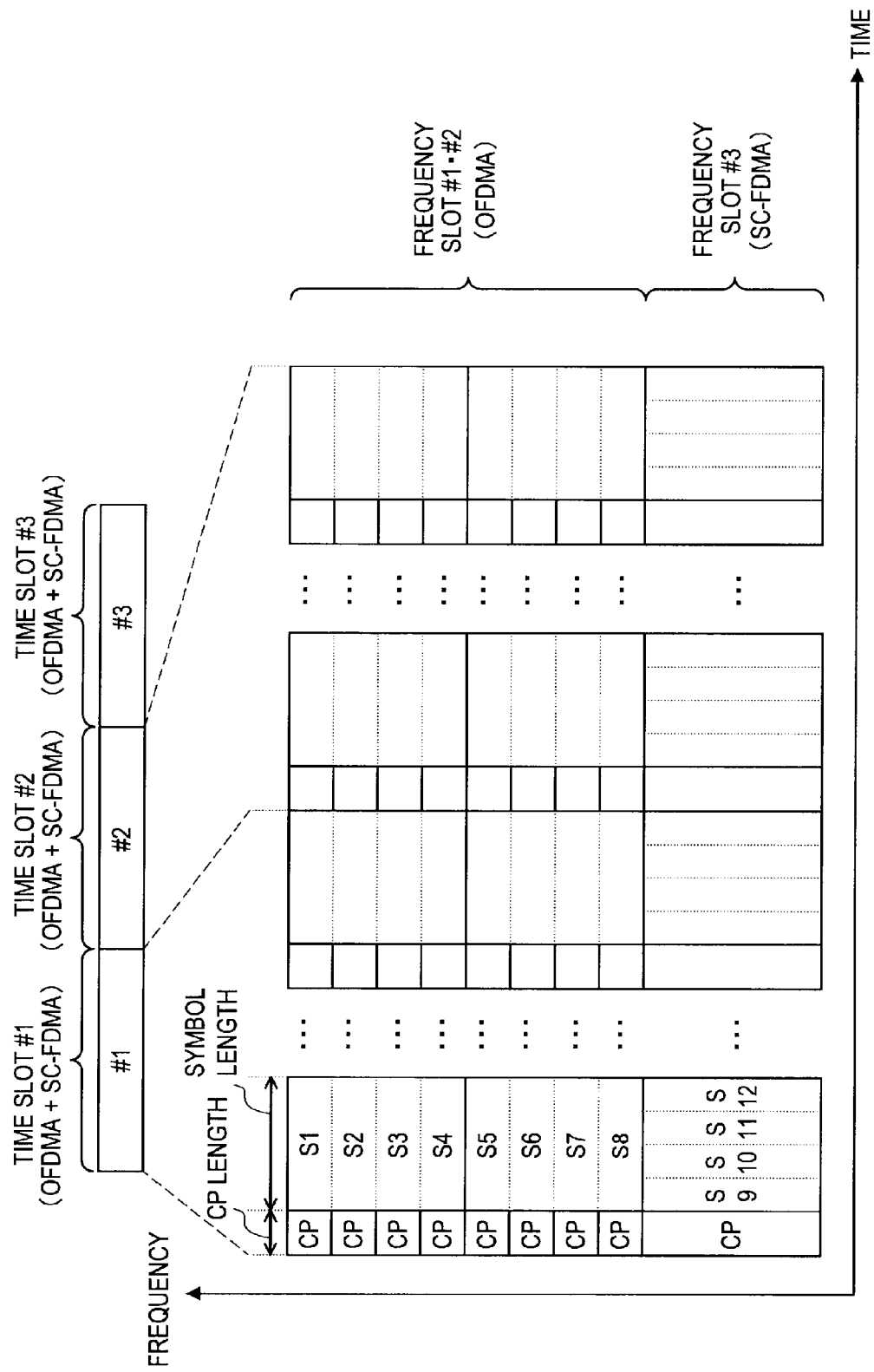

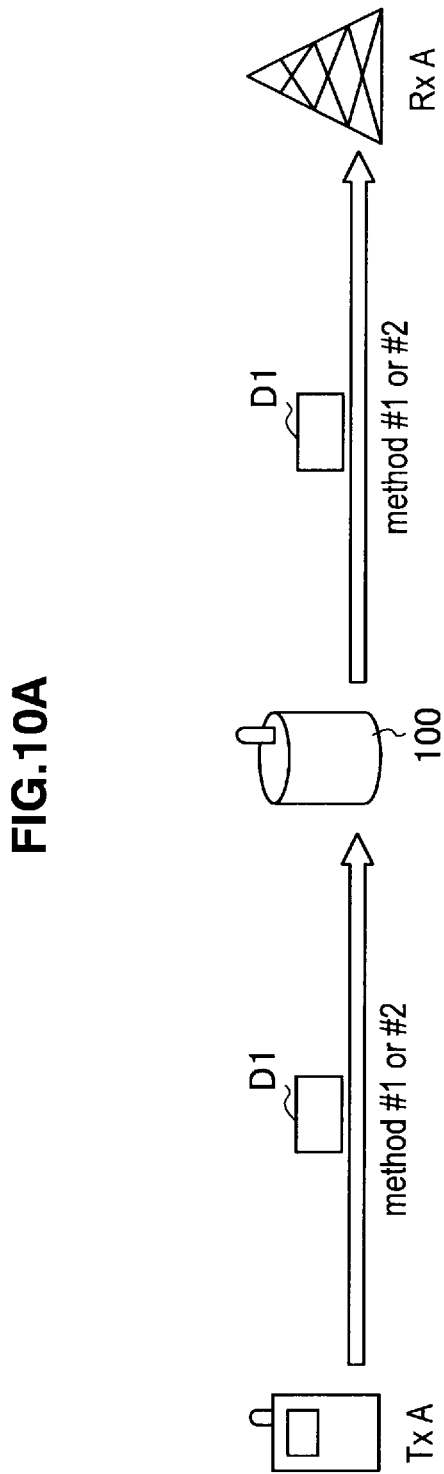

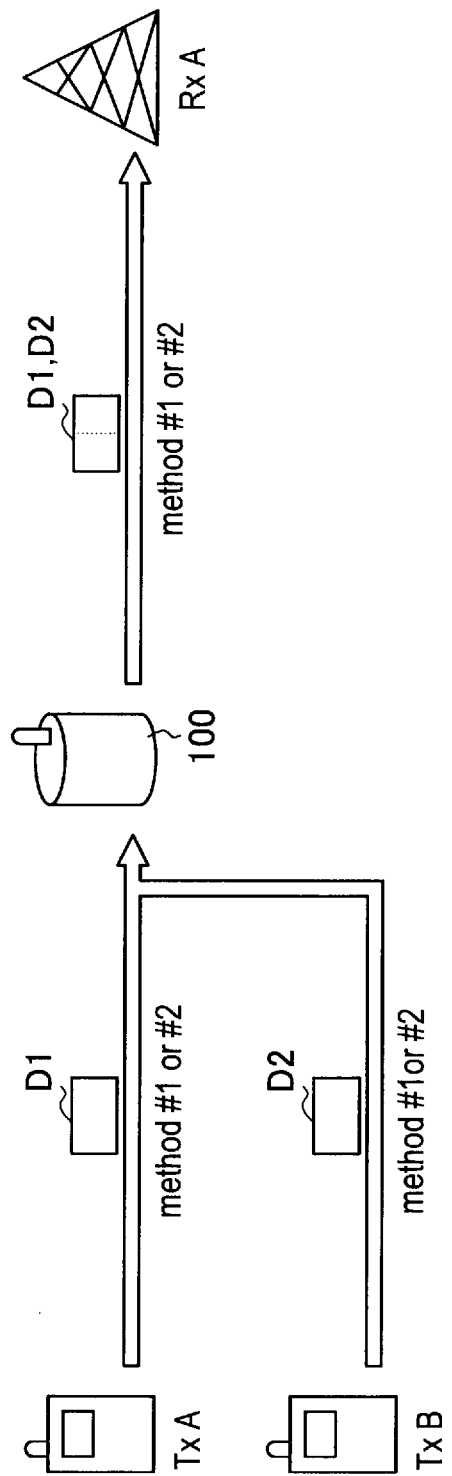

FIG.11

| No. | LINK TYPE | DIRECTION | OFDMA | SC-FDMA |
|---|---|---|---|---|
| 1 | ACCESS LINK | UPLINK | × | ○ |
| 2 | | DOWNLINK | ○ | × |
| 3 | RELAY LINK | UPLINK | ○ | ○ |
| 4 | | DOWNLINK | ○ | ○ |

○ : SELECTABLE

× : NON-SELECTABLE

RELAY STATION, RELAY METHOD, RADIO COMMUNICATION SYSTEM, AND RADIO COMMUNICATION APPARATUS

TECHNICAL FIELD

The present invention relates to a relay station, a relay method, a radio communication system, and a radio communication apparatus.

BACKGROUND ART

For radio communication system, one important interest now lies in how wide a geographical region a service can be provided to, that is, the width of coverage of a system. Radio waves used for radio communication spatially attenuate due to factors such as the distance of propagation, presence of obstacles, reflection, or scattering and thus, overcoming an influence of attenuation of radio waves is key to expanding coverage of the system.

One method of expanding coverage of a radio communication system is to relay a radio signal via a relay station, that is, to use relay communication. In relay communication, a relay station is positioned between two communication apparatuses that are incapable of (or have difficulty in) directly transmitting/receiving a radio signal to each other and a radio signal is relayed by the relay station. In LTE (Long Term Evolution)—Advanced, which is a next-generation cellular communication standard under consideration by 3GPP (Third Generation Partnership Project), for example, improvement of throughput at cell edges is proposed by making full use of relay communication by relay stations. Moreover, by using relay communication, a mesh network can be constructed through the formation of a mesh-like network.

Examples of technology related to relay communication include, for example, Patent Literature 1 and Patent Literature 2 below. In Patent Literature 1 below, a technology to check an increase in power consumption by a relay station by extracting and relaying a portion of a subcarrier signal contained in a multicarrier signal in the relay station is described. In Patent Literature 2 below, a technology to prevent interference between a transmission signal and a reception signal and to realize stable relay communication by using a different channel for transmission of a signal to a destination from a channel used for reception of a signal from a source is described.

CITATION LIST

Patent Literature

PTL 1: Japanese Patent Application National Publication No. 2006/035902

PTL 2: Japanese Patent Application Laid-Open No. 2007-60212

SUMMARY OF INVENTION

Technical Problem

However, in technology described in Patent Literature 1 or Patent Literature 2, a relay station uses the same modulation and multiplexing method for reception and transmission of a signal. Then, if, for example, the OFDMA (Orthogonal Frequency Division Multiple Access) method is used as the modulation and multiplexing method, a peak-to-average power ratio of a radio signal tends to rise. In such a case, if an attempt is made to maintain link quality in relay communication at a high level, transmission power increases, leading to disadvantages that power consumption by the relay station or a mobile station increases. In contrast, if the modulation and/or multiplexing method can adaptively be selected depending on the condition of each communication link for relay communication, a contribution to improvement of link quality in relay communication, reduction of power consumption, or improvement of performance can be expected.

Solution to Problem

According to one exemplary embodiment, the present invention is directed to a relay node in a mobile communication network for relaying communications between a base station and a mobile terminal. The relay station includes a first communication unit configured to communicate with the base station via a backhaul link using at least one of a first modulation method and a first multiplexing method; a second communication unit configured to communicate with the mobile terminal via an access link using at least one of a second modulation method and a second multiplexing method; and a communication control unit configured to select the at least one of the first modulation method and the first multiplexing method, or select the at least one of the second modulation method and the second multiplexing method based on a link characteristic, a type of link or a type of data included in a communication signal.

The first modulation method may be a same modulation method as the second modulation method.

The first modulation method may be a different modulation method than the second modulation method.

The first multiplexing method may be a same multiplexing method as the second multiplexing method.

The first multiplexing method may be a different multiplexing method than the second multiplexing method.

The communication control unit may be configured to select the at least one of the first modulation method and the first multiplexing method based on a characteristic of the backhaul link.

The combination of the first modulation method and the first multiplexing method may be Orthogonal Frequency Division Multiple Access (OFDMA) or Single Carrier-Frequency Division Multiple Access (SC-FDMA).

The communication control unit may be configured to select OFDMA for a downlink connection with the base station via the backhaul link.

The communication control unit may be configured to select SC-FDMA for an uplink connection with the base station via the backhaul link.

According to another exemplary embodiment, the present invention is directed to a computer-readable recording medium including computer program code, which when executed by a relay node, cause the relay node to perform a method of relaying communications between a base station and a mobile terminal, the method comprising: selecting at least one of a first modulation method and a first multiplexing method for communicating with a base station via a backhaul link; selecting at least one of a second modulation method and a second multiplexing method for communicating with the mobile station via an access link; communicating with the base station via the backhaul link using the at least one of the first modulation method and the first multiplexing method; and communicating with the mobile station via the at least one of the second modulation method and the second multiplexing method.

The first modulation method may be a same modulation method as the second modulation method.

The first modulation method may be a different modulation method than the second modulation method.

The first multiplexing method may be a same multiplexing method as the second multiplexing method.

The first multiplexing method may be a different multiplexing method than the second multiplexing method.

According to another exemplary embodiment, the present invention is directed to a method performed by a relay node of relaying communications between a base station and a mobile terminal, the method comprising: selecting, by a communication control unit of the relay node, at least one of a first modulation method and a first multiplexing method for communicating with a base station via a backhaul link; selecting, by a communication control unit of the relay node, at least a second modulation method and a second multiplexing method for communicating with the mobile station via an access link; communicating, by a first communication unit of the relay node, with the base station via the backhaul link using the at least one of the first modulation method and the first multiplexing method; and communicating, by a second communication unit of the relay node, with the mobile station via the access link using the at least one of the second modulation method and the second multiplexing method.

The first modulation method may be a same modulation method as the second modulation method. The first modulation method may be a different modulation method than the second modulation method. The first multiplexing method may be a same multiplexing method as the second multiplexing method. The first multiplexing method may be a different multiplexing method than the second multiplexing method.

According to one exemplary embodiment, the present invention is directed to a wireless communication system, comprising: a base station; a relay node configured to relay communications between the base station and a mobile terminal; a first communication control unit configured to select at least one of a first modulation method and a first multiplexing method for communication between the relay node and the base station via a backhaul link; a second communication control unit configured to select at least a second modulation method and a second multiplexing method for communication between the relay node and the mobile station via an access link; a first communication unit, at the relay node, configured to communicate with the base station via the backhaul link using the at least one of the first modulation method and the first multiplexing method; and a second communication unit, at the relay node, configured to communicate with the mobile station via the access link using the at least one of the second modulation method and the second multiplexing method. The first communication control unit and the second communication control unit may be the same or different communication control units.

According to another exemplary embodiment, the present invention is directed to a mobile terminal in a mobile communication network for receiving communications relayed from a base station to the mobile terminal via a relay node, the mobile terminal comprising: a communication interface configured to receive data from the relay node via an access link using at least one of a first modulation method and a first multiplexing method, which are selected by the relay node, wherein the data transmitted from the relay node to the mobile terminal is received at the relay node via a backhaul link using at least one of a second modulation method and a second multiplexing method.

BRIEF DESCRIPTION OF DRAWINGS

FIG. 7A is an explanatory view illustrating serial switching of a plurality of modulation and/or multiplexing methods.

FIG. 7B is an explanatory view illustrating parallel use of the plurality of modulation and/or multiplexing methods.

FIG. 10A is an explanatory view illustrating a form in which one source and one destination are present.

FIG. 10C is an explanatory view illustrating a form in which one or more sources are present.

FIG. 11 is a table illustrating an example of a selection standard of the modulation and/or multiplexing method used for relay.

DESCRIPTION OF EMBODIMENTS

Figure 1:
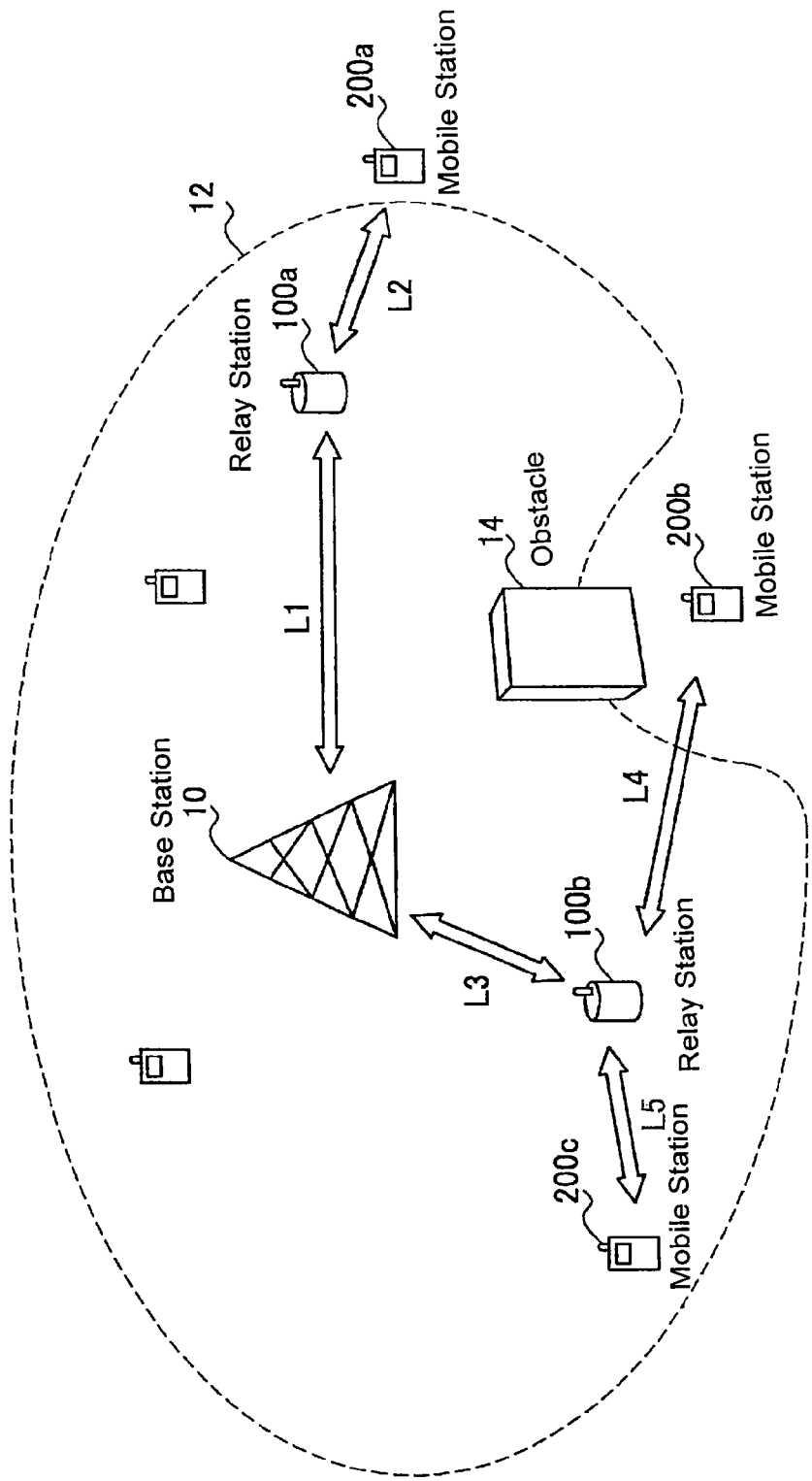
FIG. 1 is an explanatory view illustrating an outline of a radio communication system according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

"Description of Embodiments" will be described in the following order:

1. Overview of Radio Communication System According to an Embodiment
2. Configuration Example of Relay Station According to an Embodiment
   2-1. Overall Configuration
   2-2. Receiving Circuit
   2-3. Transmitting Circuit
   2-4. Communication Control Unit
3. Example of Scheduling Processing
4. Configuration of Mobile Station
5. Conclusion

1. OVERVIEW OF RADIO COMMUNICATION SYSTEM ACCORDING TO AN EMBODIMENT

First, an overview of a radio communication system according to an embodiment of the present invention will be provided with reference to FIGS. 1 to 4.

(System Configuration Example)

FIG. 1 is an explanatory view illustrating an outline of a radio communication system 1 according to an embodiment of the present invention. Referring to FIG. 1, the radio communication system 1 includes a base station 10 that provides communication services inside a region 12. Inside the region 12, a plurality of radio communication apparatuses using communication services provided by the base station 10 is shown. The plurality of radio communication apparatuses includes, for example, relay stations 100a and 100b. Further, mobile stations 200a, 200b, and 200c are shown inside or on the periphery of the region 12.

The relay stations 100a and 100b are radio communication apparatuses having a role to relay a radio signal (that is, a role to perform relay communication) between the base station 10 and one of the mobile stations. The relay station 100a or 100b may be, for example, a small base station or a radio access point to form a femtocell or a mobile station such as a mobile terminal on which a function to relay a radio signal is implemented.

In the example in FIG. 1, for example, the mobile station 200a is positioned on the periphery (that is, at cell edges) of the region 12 and it is difficult to directly transmit/receive a radio signal to/from the base station 10 because the base station 10 is far away. In this case, the relay station 100a positioned between the mobile station 200a and the base station 10 relays a radio signal between these two nodes. Accordingly, the mobile station 200a can, for example, communicate with another mobile station using a communication service provided by the base station 10.

Also in the example in FIG. 1, for example, the mobile station 200b is incapable of directly transmitting/receiving a radio signal to/from the base station 10 because an obstacle 14 blocks radio waves from the base station 10. In this case, the relay station 100b positioned on an alternative path to make a detour of the obstacle 14 relays a radio signal between these two nodes. Accordingly, the mobile station 200b can, for example, communicate with another mobile station using a communication service provided by the base station 10. Moreover, the relay station may relay a radio signal transmitted from a plurality of mobile stations or to a plurality of mobile stations. In the example in FIG. 1, the relay station 100b can relay a radio signal among the base station 10 and the mobile stations 200b and 200c.

(Example of the Modulation and/or Multiplexing Method)

In a radio communication system as illustrated in FIG. 1, in general, a signal is modulated and multiplexed according to the modulation and/or multiplexing method adopted by the system. The modulation method refers to, for example, ASK (Amplitude Shift Keying), FSK (Frequency Shift Keying), PSK (Phase Shift Keying), or QAM (Quadrature Amplitude Modulation). Among these, PSK is mainly divided into two types of BPSK (Binary Phase Shift Keying) and QPSK (Quaternary Phase Shift Keying). Among these modulation methods, bit rates that can be achieved by the same symbol rate are different, and also tolerances for noise or interference are different.

The multiplexing method (or the multiple access method) refers to, for example, TDMA (Time Division Multiple Access), CDMA (Code Division Multiple Access), SDMA (Space Division Multiple Access), or FDMA (Frequency Division Multiple Access). Among these, in the TDMA method, a plurality of time slots into which a time region is individually divided is provided and each mobile station performs communication using one of these time slots. In the CDMA method, for example, each code (a spread code or frequency hopping pattern) provided in a code region is assigned to each mobile station, and each mobile station performs communication using the assigned code. In the SDMA method, for example, communication resources are divided in a space region and multiple access is realized by differences of directivity of an antenna directed toward each mobile station. In the FDMA method, for example, a plurality of frequency slots into which a frequency region is individually divided is provided, and each mobile station performs communication using one of these frequency slots. The OFDMA (Orthogonal Frequency Division Multiple Access) method and the SC-FDMA (Single Carrier-Frequency Division Multiple Access) method can each be considered as a kind of the FDMA method. In the OFDMA method, multiple access is realized using subcarriers densely arranged in a frequency region and orthogonal to each other. In the SC-FDMA method, by contrast, multiple access is realized by handling a fixed bandwidth as a single carrier rather than dividing into a plurality of subcarriers and instead multiplexing data symbols in the time direction at a higher rate.

Further, the channel encoding method of convolutional code, turbo code, or LDPC (Low Density Parity Check) code can be considered as a kind of the modulation and/or multiplexing method.

Figure 2:
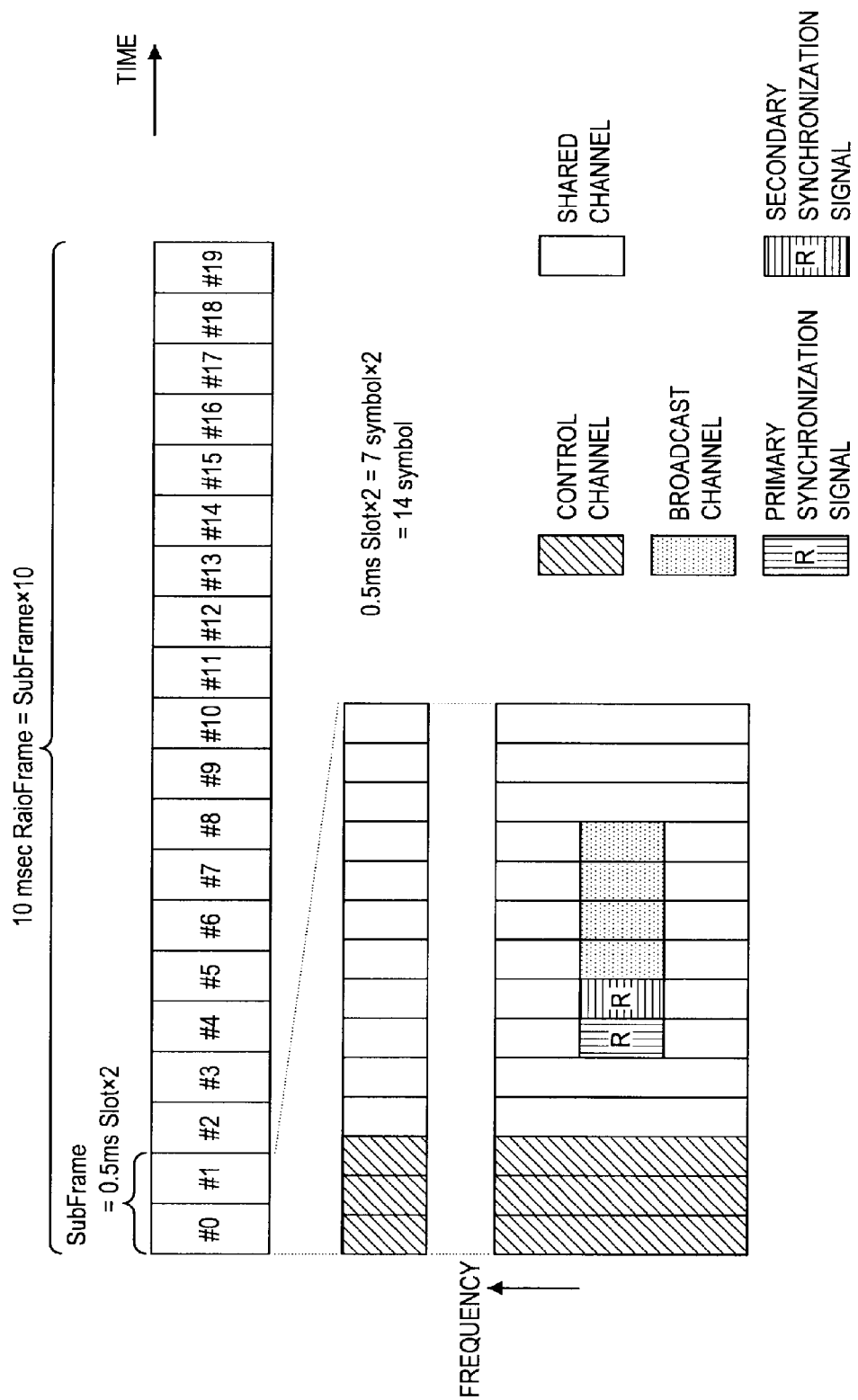
FIG. 2 is an explanatory view showing an example of the configuration of communication resources handled in the radio communication system according to an embodiment.

FIG. 2 is an explanatory view illustrating a frame configuration defined for LTE in which the OFDMA method is used for a downlink and the SC-FDMA method for an uplink.

Referring to FIG. 2, one radio frame having a length of 10 msec is composed of 10 subframes. One subframe has two slots of 0.5 msec. Therefore, one radio frame contains 20 slots #0 to #19 of 0.5 msec. Further, one slot of 0.5 msec contains seven symbols when an ordinary cyclic prefix is used. Therefore, one subframe contains 14 symbols.

In such a configuration of communication resources, resources are assigned using one subframe (14 symbols) or one slot of 0.5 msec (seven symbols) as one unit (resource block) of assignment of communication resources in LTE. One resource block also occupies a fixed bandwidth in a frequency region. When the OFDMA method is used, for example, one resource block normally contains a plurality of OFDM subcarriers.

If, as shown in the example in FIG. 1, one subframe is used as one resource block, 14 symbols contained therein are normally assigned to a control channel or a shared channel. The control channel of these channels is used for transmission of information about the modulation and/or multiplexing method or the like. Then, the information is used for reception of a radio signal, demodulation, and decoding. In LTE, the number of symbols of the control channel contained in one resource block may be one to three. If, for example, the control channel has three symbols, data is mainly stored in the shared channel containing the remaining 11 symbols.

In a time slot at a specific frequency position of a downlink, a broadcast channel, a primary synchronization signal, and a secondary synchronization signal can also be arranged. A signal series (such as the Zadoff-Chu series) superior in correlation characteristics is used as the primary synchronization signal and the secondary synchronization signal. A relay station or a mobile station can receive a signal contained in each channel by detecting such a primary synchronization signal and a secondary synchronization signal and capturing synchronization. Further, a relay station or a mobile station can transmit/receive data to/from other apparatuses using the assigned resource block based on scheduling information (information for notification of assignment of communication resources) received through the control channel or broadcast channel.

(General Relay Communication)

Figure 3:
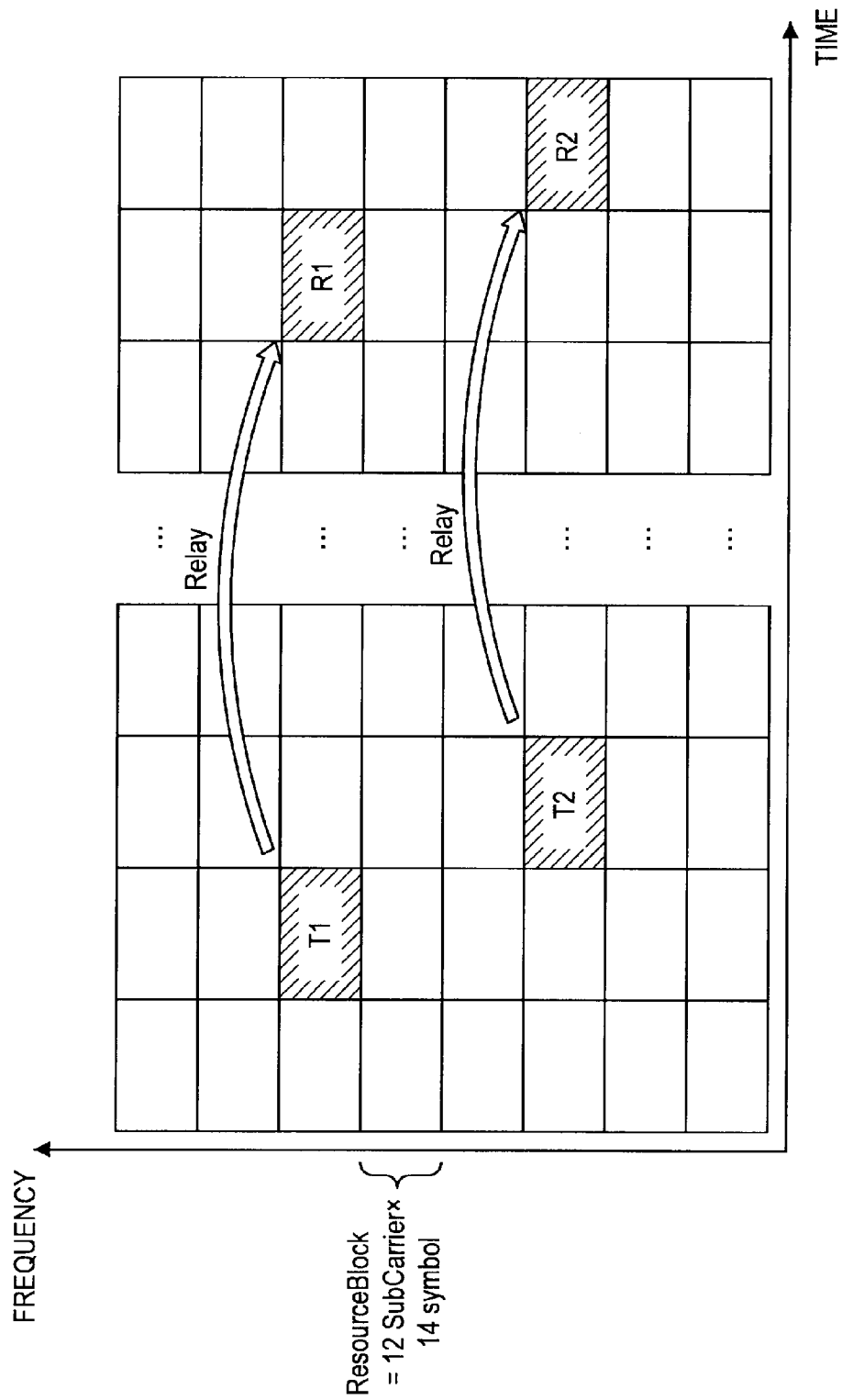
FIG. 3 is an explanatory view illustrating relay communication using resource blocks into which a time region and a frequency region are divided.

FIG. 3 is an explanatory view illustrating general relay communication performed by using the resource block described using FIG. 2.

Referring to FIG. 3 shows a grid-like diagram in which a plurality of cells are individually arranged in the horizontal and vertical directions. The horizontal axis is a time axis and the vertical axis is a frequency axis, and each cell corresponds to an individual resource block divided in a time region and a frequency region. When, in such a configuration of communication resources, a relay station performing general relay communication receives a radio signal from a source node in, for example, a resource block T1, the relay station transmits the signal to a destination node in a resource block R1 after some time needed for relay processing elapsed. Moreover, when the relay station receives a radio signal from the source node in, for example, a resource block T2, the relay station transmits the signal to the destination node in a resource block R2 after some time needed for relay processing elapsed. Which resource block to be used for reception or transmission of a radio signal is typically decided by a base station to which the relay station belongs (or a network controller connected to a plurality of base stations), which is notified as scheduling information.

In such relay communication by a relay station, as is understood from FIG. 3, two types of communication links are involved in one relay by the relay station. The first link is a link between a source node and the relay station. The second link is a link between the relay station and a destination node. In the example in FIG. 1, for example, a link L1 and a link L2 are present between the base station 10 and the mobile station 200a. A link L3 and a link L4 are present between the base station 10 and the mobile station 200b. The link L3 and a link L5 are present between the base station 10 and the mobile station 200c. Then, link quality of these communication links is normally different from link to link depending on the distance between nodes, noise or interference condition at a location where a node is positioned, or an influence of fading.

Figure 4:
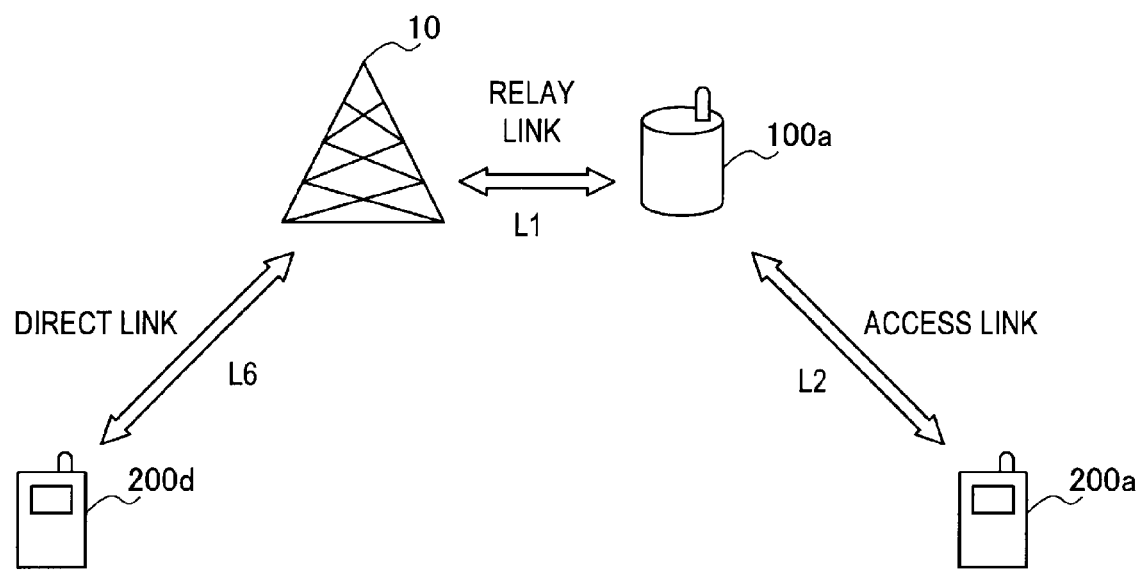
FIG. 4 is an explanatory view illustrating the types of communication link related to the relay communication.

Types of communication link are also diverse. FIG. 4 is an explanatory view illustrating the types of communication link related to relay communication. Referring to FIG. 4 shows the mobile station 200a that communicates with the base station 10 via the relay station 100a and the mobile station 200d that directly communicates with the base station 10. In this case, communication links are classified into three types of the link L1 between the base station 10 and the relay station 100a, the link L2 between the relay station 100a and the mobile station 200a, and a link L6 between the base station 10 and a mobile station 200d. Then, the link L1 is generally called a backhaul link or a relay link. The link L2 is called an access link. The link L3 is called a direct link. Among these links, links substantially involved in relay communication are the backhaul or relay link and the access link. Further, these links can be divided into uplinks and downlinks depending on the direction of communication.

Thus, if communication links are different in type or link quality, the modulation and/or multiplexing method suitable for each communication link is not necessarily uniform. If, for example, severe restrictions are imposed on transmission power even though link quality is not relatively good, reliability of communication can be maintained by using the SC-FDMA method. If, on the other hand, loose restrictions are imposed on transmission power, it is preferable to use the OFDMA method, which has a high affinity for MIMO (Multiple Input Multiple Output). When the same multiplexing method is used, required reliability can be ensured by using a higher-order modulation method (for example, 16QAM) when the link quality is high and by using a lower-order modulation method (for example, BPSK) when the link quality is low. Such proper use of the modulation and/or multiplexing method is also affected by apparatus capabilities. If, for example, a mobile station can use only the OFDMA method to receive a downlink signal, a relay station should use the OFDMA method at least as the multiplexing method regardless of the link quality.

Based on what has been described above, the configuration of a relay station 100 that adaptively selects the modulation and/or multiplexing method depending on the condition of each communication link (that is, the link type, link quality or the like) for relay communication will be described in detail in the next section as an embodiment of the present invention.

If it is not necessary to mutually distinguish particularly the relay station 100a and the relay station 100b herein in the description below, the relay station is generically called the relay station 100 by omitting the alphabet at the end of the numeral. This also applies to the mobile stations 200a, 200b and the like (mobile station 200).

An example in which the OFDMA method and the SC-FDMA method are mainly used for different purposes (or used in combination) for relay communication will herein be described. However, the present invention is not limited to such an example and it is needless to say that the present invention is also applicable to combinations of other modulation and/or multiplexing methods.

2. CONFIGURATION EXAMPLE OF RELAY STATION ACCORDING TO AN EMBODIMENT

<2-1. Overall Configuration>

Figure 5:
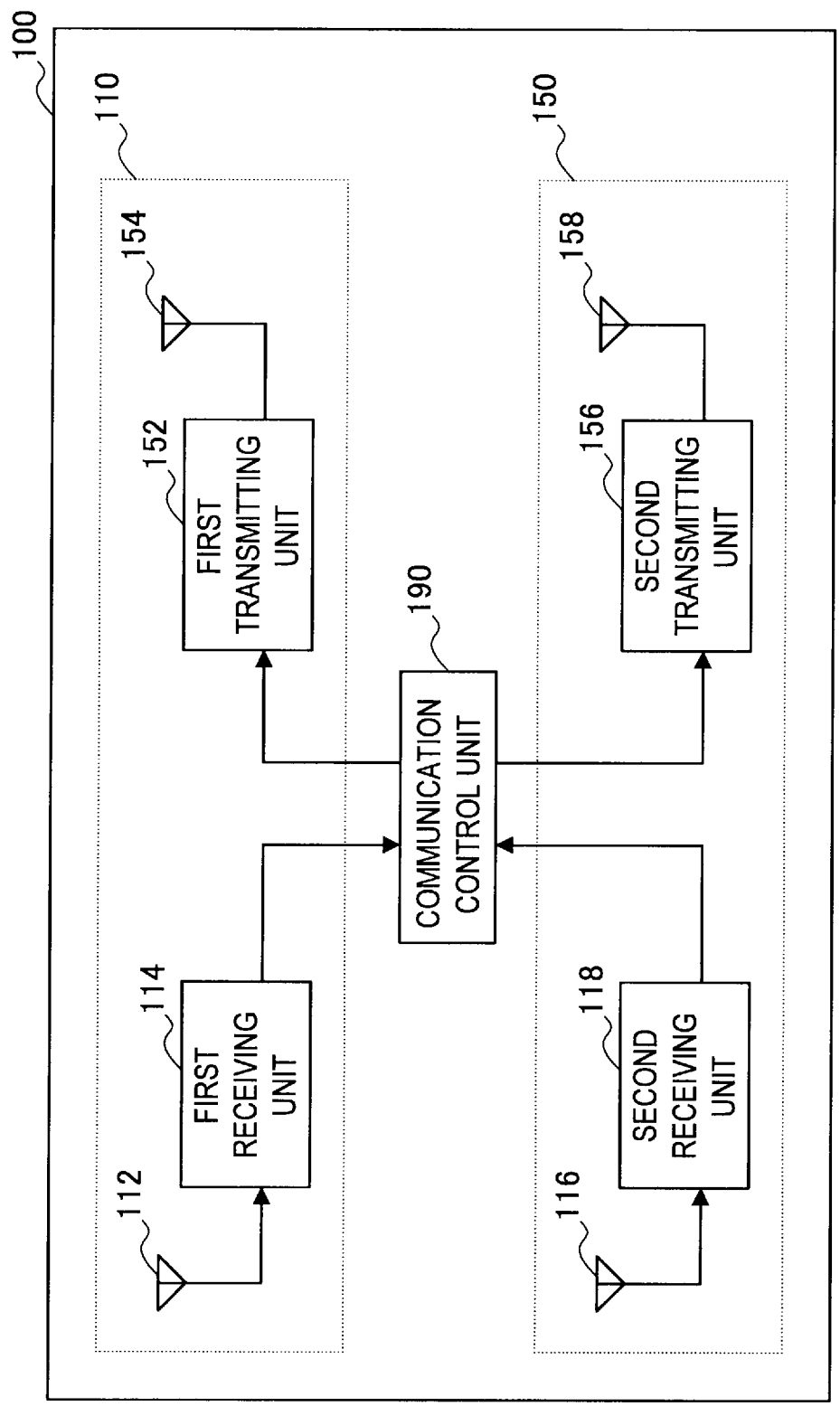
FIG. 5 is a block diagram showing an example of the configuration of a relay station according to an embodiment.

FIG. 5 is a block diagram showing an example of the logical configuration of the relay station 100 according to an embodiment of the present invention. Referring to FIG. 5, the relay station 100 includes a first communication unit 110, a second communication unit 150, and a communication control unit 190. The first communication unit 110 contains a receiving antenna 112, a first receiving unit 114, a first transmitting unit 152, and a transmitting antenna 154. The second communication unit 150 contains a receiving antenna 116, a second receiving unit 118, a second transmitting unit 156, and a transmitting antenna 158.

The first communication unit 110 is a communication circuit used by the relay station 100 for communication using a first modulation and/or multiplexing method. The second communication unit 150, on the other hand, is a communication circuit used by the relay station 100 for communication using a second modulation and/or multiplexing method. In the present embodiment, the first modulation and/or multiplexing method is assumed to be a method that uses at least the OFDMA method as the multiplexing method. The second modulation and/or multiplexing method is assumed to be a method that uses at least the SC-FDMA method as the multiplexing method.

Figure 6A:
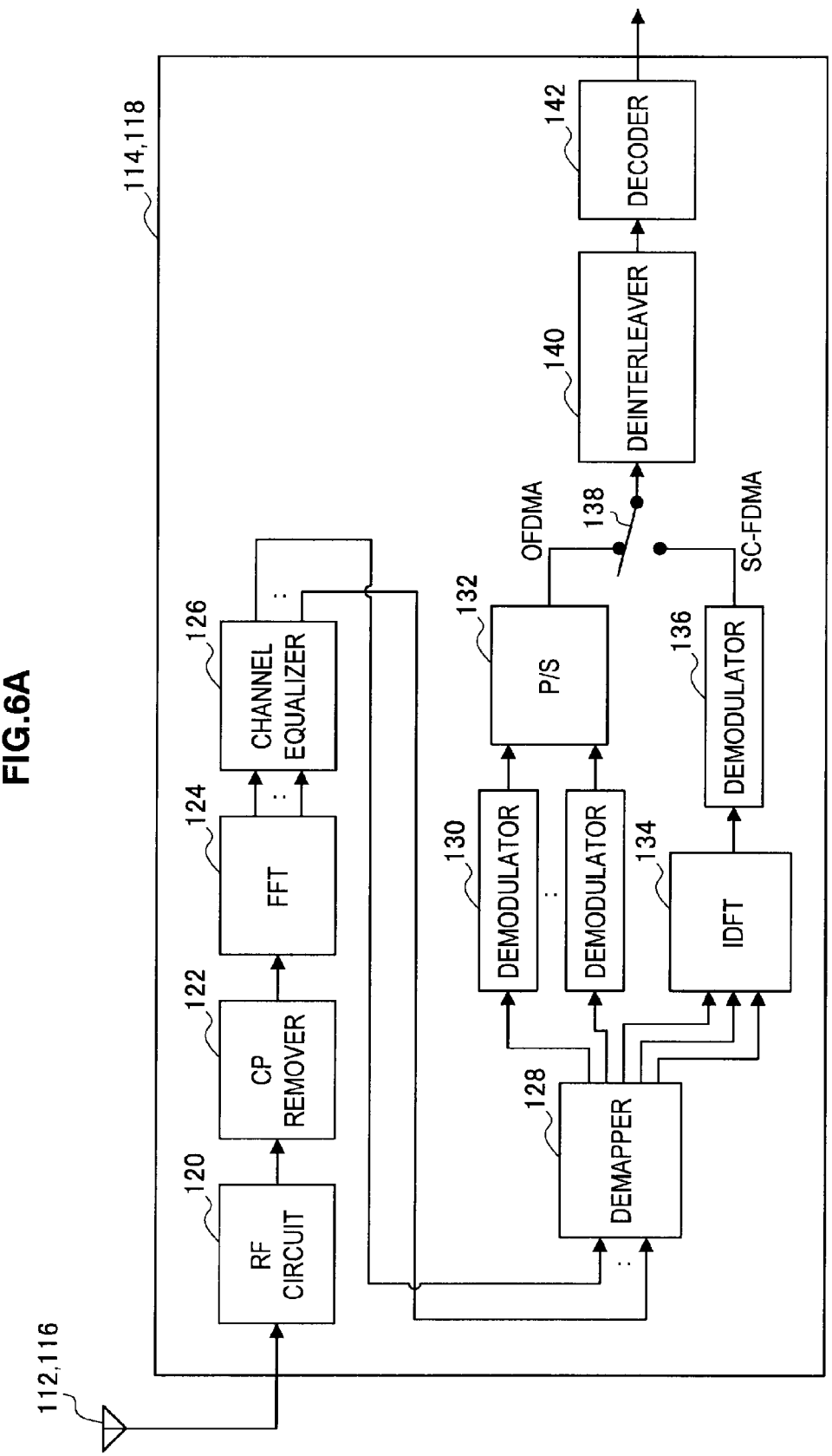
FIG. 6A is a block diagram showing an example of a concrete configuration of a receiving unit of the relay station according to an embodiment.
Figure 6B:
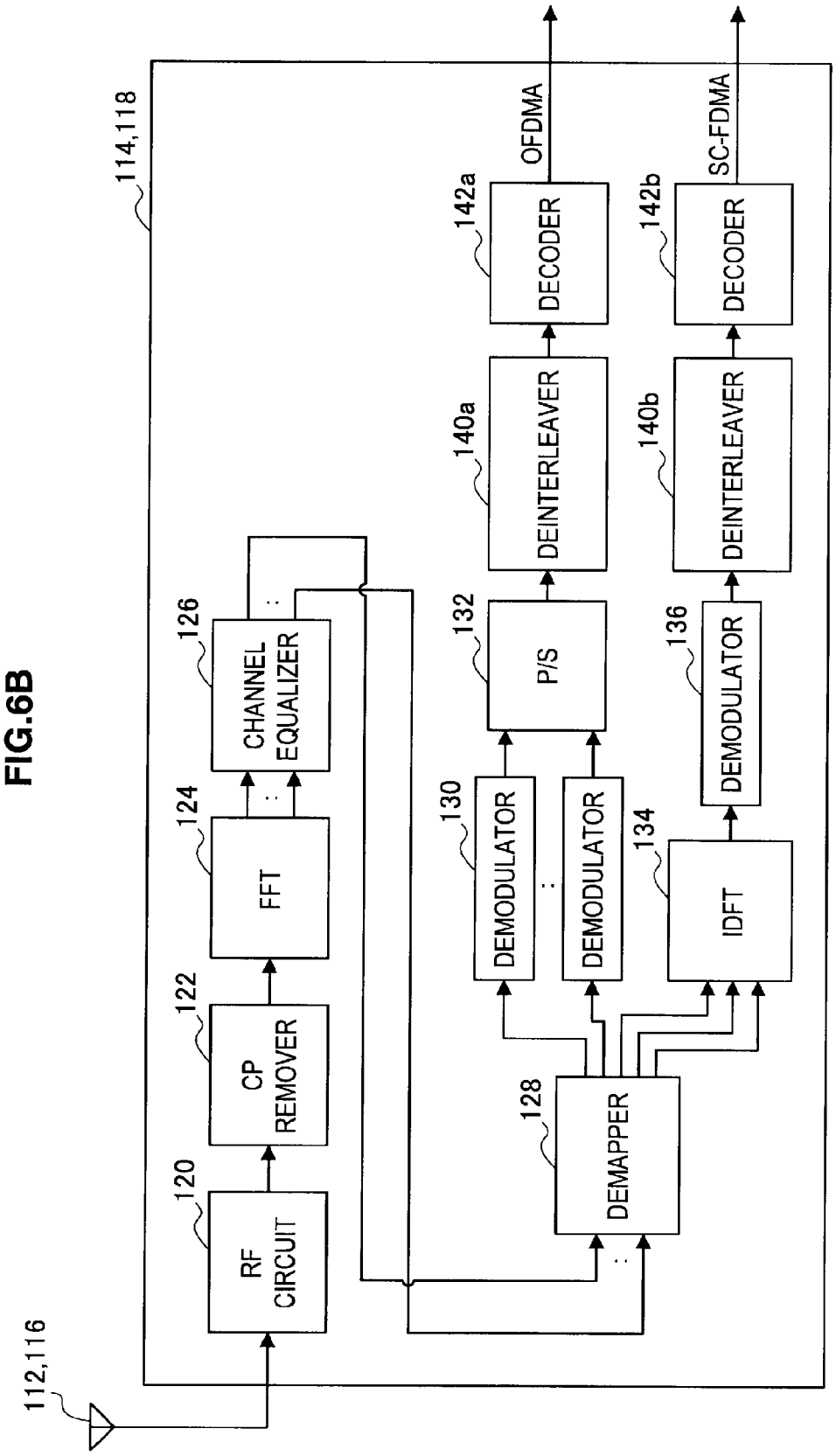
FIG. 6B is a block diagram showing another example of the concrete configuration of the receiving unit of the relay station according to an embodiment.

When, as described above, the relay station 100 supports the OFDMA method and the SC-FDMA method, the first communication unit 110 and the second communication unit 150 can share a portion of a receiving circuit and a transmitting circuit. FIGS. 6A and 6B each show, for example, two configuration examples in which a portion of the receiving circuit is shared between the first receiving unit 114 of the first communication unit 110 and the second receiving unit 118 of the second communication unit 150.

<2-2. Receiving Circuit>

(First Configuration Example of the Receiving Circuit)

Referring to FIG. 6, the first receiving unit 114 and the second receiving unit 118 contain an RF (Radio Frequency) circuit 120, a CP (Cyclic Prefix) remover 122, a fast Fourier transformer (FFT) 124, a channel equalizer 126, a demapper 128, a plurality of demodulators 130, a parallel-serial converter (P/S) 132, an inverse discrete Fourier transformer (IDFT) 134, a demodulator 136, a switch 138, a deinterleaver 140, and a decoder 142.

The receiving antenna 112 (116) is connected to the RF circuit 120 and used to receive a radio signal. The RF circuit 120 amplifies a reception signal output from the receiving antenna 112 (116) and makes a frequency conversion and an AD (Analogue to Digital) conversion before outputting the reception signal to the CP remover 122.

The CP remover 122 removes the cyclic prefix from a reception signal input as a digital signal from the RF circuit 120. Then, the CP remover 122 outputs the reception signal to the FFT 124.

The FFT 124 extracts a plurality of subcarrier signals from a multicarrier signal by performing a fast Fourier transform of the reception signal input from the CP remover 122. Then, the FFT 124 outputs the plurality of extracted subcarrier signals to the channel equalizer 126.

The channel equalizer 126 equalizes the plurality of extracted subcarrier signals input from the FFT 124 in accordance with characteristics of a channel estimated based on, for example, a reference signal. Then, the channel equalizer 126 outputs the subcarrier signals after being equalized to the demapper 128.

The demapper 128 maps the plurality of subcarrier signals input from the channel equalizer 126 to the plurality of demodulators 130 or the IDFT 134.

The plurality of demodulators 130 and the P/S 132 are branches used when the first modulation and/or multiplexing method is used. The plurality of demodulators 130 each demodulates subcarrier signals input from the demapper 128 in parallel according to a specific modulation method. Then, the P/S 132 serializes bit strings after being demodulated output in parallel from each of the demodulators 130 and outputs the serialized bit string to the switch 138.

On the other hand, the IDFT 134 and the demodulator 136 are branches used when the second modulation and/or multiplexing method is used. The IDFT 134 generates a single carrier signal by converting each frequency component of the plurality of subcarrier signals input from the demapper 128 into a time component by the inverse discrete Fourier transform. Next, the demodulator 136 demodulates the single carrier signal output from the IDFT 134 according to a specific multiplexing method. Then, the demodulator 136 outputs the demodulated bit string to the switch 138.

The switch 138 toggles input into the deinterleaver between the first branch and the second branch in accordance with control from the communication control unit 190 described later. If, for example, the first modulation and/or multiplexing method is used to receive a signal by the relay station 100, the switch 138 causes a bit string output from the P/S 132 to enter the deinterleaver 140. If, on the other hand, the second modulation and/or multiplexing method is used to receive a signal by the relay station 100, the switch 138 causes a bit string output from the demodulator 136 to enter the deinterleaver 140.

The deinterleaver 140 restores the bit string (that is, deinterleaves the bit string) input via the switch 138 and rearranged to improve reliability of error correction to its original order. Then, the deinterleaver 140 outputs the bit string to the decoder 142.

The decoder 142 acquires a data signal by decoding the bit string input from the deinterleaver 140 according to a specific encoding method. Then, the decoder 142 outputs the acquired data signal to the communication control unit 190 (and to a higher layer such as the MAC layer if necessary).

According to the first configuration example shown in FIG. 6A, the RF circuit 120, the CP remover 122, the FFT 124, the channel equalizer 126, the demapper 128, the deinterleaver 140, and the decoder 142 are shared between the first receiving unit 114 and the second receiving unit 118. Accordingly, it becomes possible to downsize hardware of the relay station 100 or to reduce manufacturing costs thereof.

The modulation and/or multiplexing method used by the relay station 100 for reception of a radio signal can serially be switched for each time slot by the operation of the switch 138. That is, for example, the relay station 100 can receive a radio signal by using the first modulation and/or multiplexing method in a first time slot (or a first resource block) and then receive a radio signal by using the second modulation and/or multiplexing method in a second time slot (or a second resource block).

(Second Configuration Example of the Receiving Circuit)

Referring to FIG. 6B, on the other hand, the first receiving unit 114 and the second receiving unit 118 contain the RF circuit 120, the CP remover 122, the FFT 124, the channel equalizer 126, the demapper 128, the plurality of demodulators 130, the P/S 132, a deinterleaver 140a, a decoder 142a, the IDFT 134, the demodulator 136, a deinterleaver 140b, and a decoder 142b.

In the configuration example in FIG. 6B, the P/S 132 serializes bit strings after being demodulated output in parallel from each of the demodulators 130 and outputs the serialized bit string to the deinterleaver 140a. The deinterleaver 140a deinterleaves the bit string input from the P/S 132 and outputs the deinterleaved bit string to the decoder 142a. The decoder 142a acquires a data signal by decoding the bit string input from the deinterleaver 140a according to a specific encoding method. Then, the decoder 142a outputs the acquired data signal to the communication control unit 190 (and to a higher layer such as the MAC layer if necessary).

The demodulator 136, on the other hand, demodulates a single carrier signal output from the IDFT 134 according to a specific modulation method and outputs the demodulated bit string to the deinterleaver 140b. The deinterleaver 140b deinterleaves the bit string input from the demodulator 136 and outputs the deinterleaved bit string to the decoder 142b. The decoder 142b acquires a data signal by decoding the bit string input from the deinterleaver 140b according to a specific encoding method. Then, the decoder 142b outputs the acquired data signal to the communication control unit 190 (and to a higher layer such as the MAC layer if necessary).

According to the second configuration example shown in FIG. 6B, the RF circuit 120, the CP remover 122, the FFT 124, the channel equalizer 126, and the demapper 128 are shared between the first receiving unit 114 and the second receiving unit 118. Also in this case, it becomes possible to downsize hardware of the relay station 100 or to reduce manufacturing costs thereof.

Further, according to the second configuration, a radio signal according to the first modulation and/or multiplexing method and a radio signal according to the second modulation and/or multiplexing method can be received in parallel in the form of frequency multiplexing. That is, for example, the relay station 100 can receive a radio signal by using the first modulation and/or multiplexing method in first frequency slot (or the first resource block) and at the same time, receive a radio signal by using the second modulation and/or multiplexing method in second frequency slot (or the second resource block). Particularly, if the first modulation and/or multiplexing method supports the OFDMA method and the second modulation and/or multiplexing method supports the SC-FDMA method and if the symbol length and the cyclic prefix length used in each method are equal, the CP remover 122 can uniformly remove the cyclic prefix regardless of to which method a reception signal conforms.

FIG. 7A is an explanatory view illustrating serial switching of the first and second modulation and/or multiplexing methods. Referring to FIG. 7A, four symbols S1 to S4 (and subsequent groups of symbols) modulated for each subcarrier according to the OFDMA method are transmitted in a first time slot (#1). Next, in a second time slot (#2), four symbols S5 to S8 (and subsequent groups of symbols) modulated for each subcarrier according to the OFDMA method are transmitted. Next, in a third time slot (#3), four symbols S9 to S12 serially modulated for a single carrier according to the SC-FDMA method are transmitted. A cyclic prefix (CP) is inserted between each symbol in the time direction. Such serial switching of the modulation and/or multiplexing methods is carried out under the control of the communication control unit 190 by, for example, the switch 138 shown in FIG. 6A in the receiving circuit.

FIG. 7B is an explanatory view illustrating parallel use of the first and second modulation and/or multiplexing methods. Referring to FIG. 7B, eight symbols S1 to S8 modulated for each subcarrier according to the OFDMA method are transmitted in first and second frequency bands (#1/#2). At the same time, in a third frequency band (#3), four symbols S9 to S12 serially modulated for a single carrier according to the SC-FDMA method are transmitted. A cyclic prefix (CP) is inserted between each symbol in the time direction. In the example in FIG. 7B, the symbol length according to the OFDMA method and that according to the SC-FDMA method and the cyclic prefix length (CP length) according to the OFDMA method and that according to the SC-FDMA method are each mutually equal. By adopting such settings, two methods can be used in parallel by using a simple hardware configuration shown in FIG. 6B.

Naturally, the number of symbols for each slot, the symbol length, and the CP length shown in FIGS. 7A and 7B are each only examples. That is, it is needless to say that any other number of symbols for each slot, any other symbol length, or any other CP length may be used.

<2-3. Transmitting Circuit>

(First Configuration Example of the Transmitting Circuit)

Figure 8A:
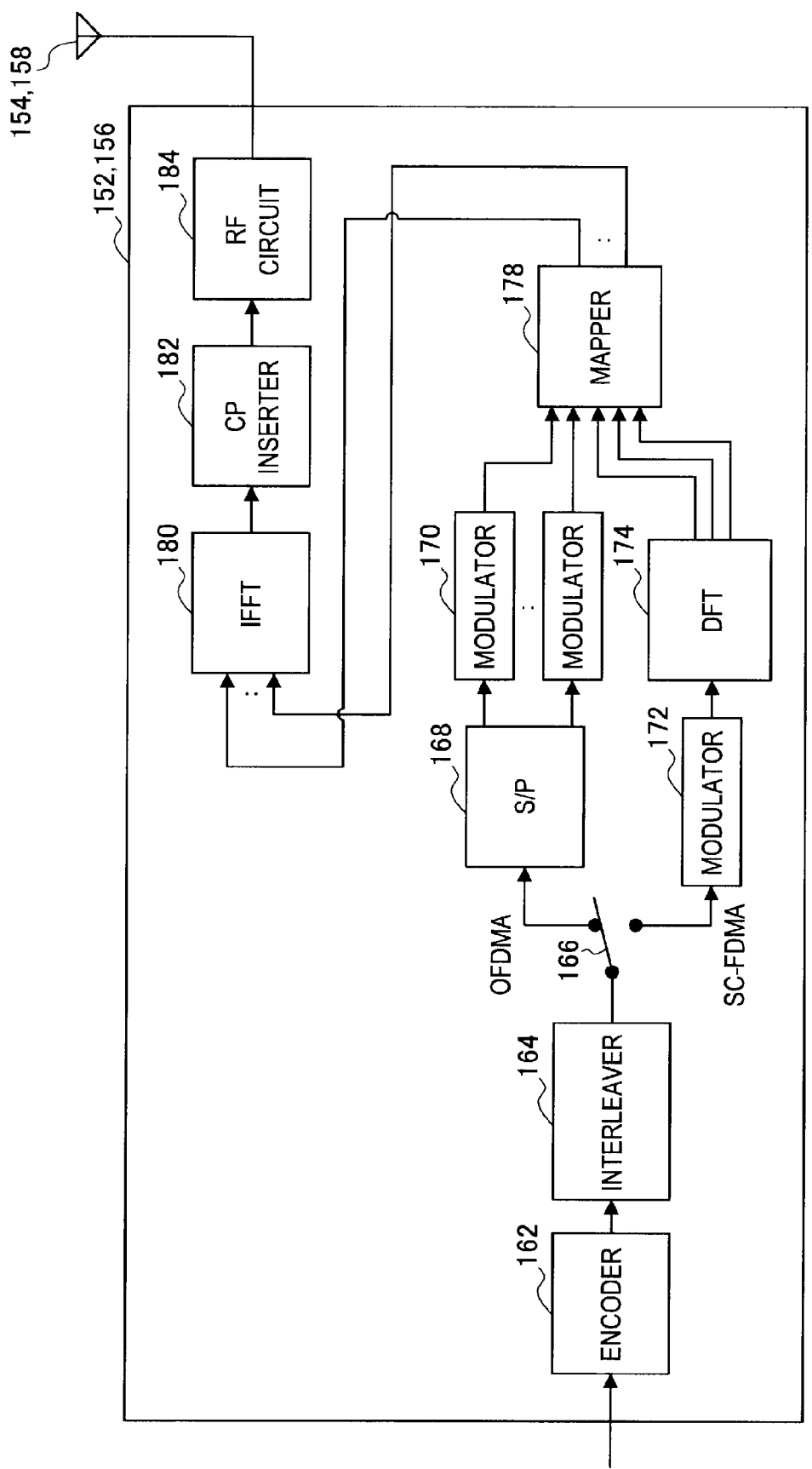
FIG. 8A is a block diagram showing an example of the concrete configuration of a transmitting unit of the relay station according to an embodiment.
Figure 8B:
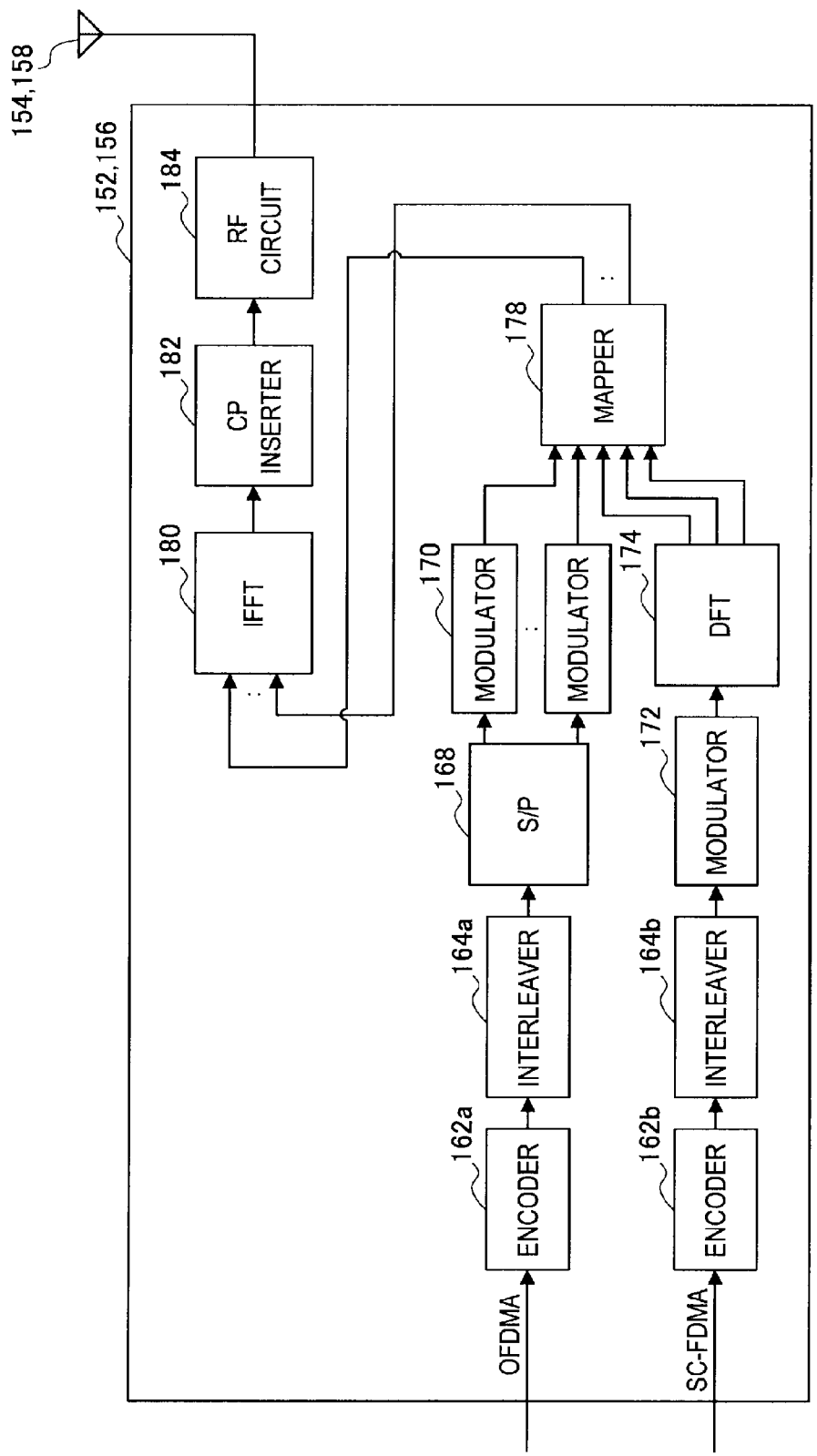
FIG. 8B is a block diagram showing another example of the concrete configuration of the transmitting unit of the relay station according to an embodiment.

FIGS. 8A and 8B show two configuration examples in which a portion of the transmitting circuit is shared between the first transmitting unit 152 of the first communication unit 110 and the second transmitting unit 156 of the second communication unit 150.

Referring to FIG. 8A, the first transmitting unit 152 and the second transmitting unit 156 contain an encoder 162, an interleaver 164, a switch 166, a serial-parallel converter (S/P) 168, a plurality of modulators 170, a modulator 172, a discrete Fourier transformer (DFT) 174, a mapper 178, an inverse fast Fourier transformer (IFFT) 180, a CP inserter 182, and an RF circuit 184.

The encoder 162 generates a bit string to be transmitted by encoding a data signal input from the communication control unit 190 according to a specific encoding method. Then, the encoder 162 outputs the generated bit string to the interleaver 164.

The interleaver 164 rearranges the bit order (that is, interleaves the bit order) of the bit string input from the encoder 162 to improve reliability of error correction. Then, the interleaver 164 outputs the interleaved bit string to the switch 166.

The switch 166 switches the output destination of the bit string from the interleaver 164 between the first branch and the second branch in accordance with control from the communication control unit 190 described later. If, for example, the first modulation and/or multiplexing method is used to transmit a signal by the relay station 100, the switch 166 causes a bit string output from the interleaver 164 to enter the S/P 168. If, on the other hand, the second modulation and/or multiplexing method is used to transmit a signal by the relay station 100, the switch 166 causes a bit string output from the interleaver 164 to enter the modulator 172.

The S/P 168 and the plurality of modulators 170 are branches used when the first modulation and/or multiplexing method is used. The S/P 168 parallelizes the bit string input via the switch 166 and outputs bit strings to each of the modulators 170. The plurality of modulators 170 also modulates the bit string input from the S/P 168 each according to a specific modulation method to generate subcarrier signals. Then, the plurality of modulators 170 outputs a plurality of generated subcarrier signals to the mapper 178.

The modulator 172 and the DFT 174, on the other hand, are branches used when the second modulation and/or multiplexing method is used. The modulator 172 modulates the bit string input via the switch 166 according to a specific modulation method to generate a single carrier signal. The DFT 174 converts a time component of the single carrier signal generated by the modulator 172 into a frequency component by the discrete Fourier transform. Then, the DFT 174 outputs the converted signal to the mapper 178.

The mapper 178 maps a signal input from the plurality of modulators 170 or the DFT 174 to the IFFT 180.

The IFFT 180 synthesizes signals input from the mapper 178 in parallel by performing the inverse fast Fourier transform to generate a transmission signal. Then, the IFFT 180 outputs the generated transmission signal to the CP inserter 182.

The CP inserter 182 inserts a cyclic prefix into the transmission signal input from the IFFT 180. The cyclic prefix may be, for example, a cyclic copy of a portion of subsequent symbols. Then, the CP inserter 182 outputs the transmission signal into which a cyclic prefix is inserted to the RF circuit 184.

The transmitting antenna 154 (158) is connected to the RF circuit 184 and used for transmission of a radio signal. The RF circuit 184 causes the transmitting antenna 154 (158) to transmit the transmission signal input from the CP inserter 182 as a radio signal after the transmission signal being DA (Digital to Analogue) converted, frequency converted, and amplified.

According to the first configuration example shown in FIG. 8A, the encoder 162, the interleaver 164, the mapper 178, the IFFT 180, the CP inserter 182, and the RF circuit 184 are shared between the first transmitting unit 152 and the second transmitting unit 156. Accordingly, it becomes possible to downsize hardware of the relay station 100 or to reduce manufacturing costs thereof.

The modulation and/or multiplexing method used by the relay station 100 for transmission of a radio signal can serially be switched for each time slot by the operation of the switch 166. That is, for example, the relay station 100 can transmit a radio signal by using the first modulation and/or multiplexing method in a first time slot (or a first resource block) and then transmit a radio signal by using the second modulation and/or multiplexing method in a second time slot (or a second resource block).

(Second Configuration Example of the Transmitting Circuit)

Referring to FIG. 8B, on the other hand, the first transmitting unit 152 and the second transmitting unit 156 contain an encoder 162a, an interleaver 164a, the S/P 168, the plurality of modulators 170, an encoder 162b, an interleaver 164b, the modulator 172, the DFT 174, the mapper 178, the IFFT 180, the CP inserter 182, and the RF circuit 184.

In the configuration example in FIG. 8B, the encoder 162a generates a bit string to be transmitted by encoding a data signal input from the communication control unit 190 according to a specific encoding method. Then, the encoder 162a outputs the generated bit string to the interleaver 164a. The interleaver 164a interleaves the bit string input from the encoder 162a. Then, the interleaver 164a outputs the interleaved bit string to the S/P 168.

The encoder 162b, on the other hand, generates a bit string to be transmitted by encoding a data signal input from the communication control unit 190 according to a specific encoding method. Then, the encoder 162b outputs the generated bit string to the interleaver 164b. The interleaver 164b interleaves the bit string input from the encoder 162b. Then, the interleaver 164b outputs the interleaved bit string to the modulator 172.

According to the second configuration example shown in FIG. 8B, the mapper 178, the IFFT 180, the CP inserter 182, and the RF circuit 184 are shared between the first transmitting unit 152 and the second transmitting unit 156. Also in this case, it becomes possible to downsize hardware of the relay station 100 or to reduce manufacturing costs thereof.

Further, according to the second configuration, a radio signal according to the first modulation and/or multiplexing method and a radio signal according to the second modulation and/or multiplexing method can be transmitted in parallel in the form of frequency multiplexing. That is, for example, the relay station 100 can transmit a radio signal by using the first modulation and/or multiplexing method in first frequency slot (or the first resource block) and at the same time, transmit a radio signal by using the second modulation and/or multiplexing method in second frequency slot (or the second resource block). Particularly, if the first modulation and/or multiplexing method supports the OFDMA method and the second modulation and/or multiplexing method supports the SC-FDMA method and if the symbol length and the cyclic prefix length used in each method are equal, the CP inserter 182 can uniformly insert the cyclic prefix regardless of to which method a transmission signal conforms.

<2-4. Communication Control Unit>

Figure 9:
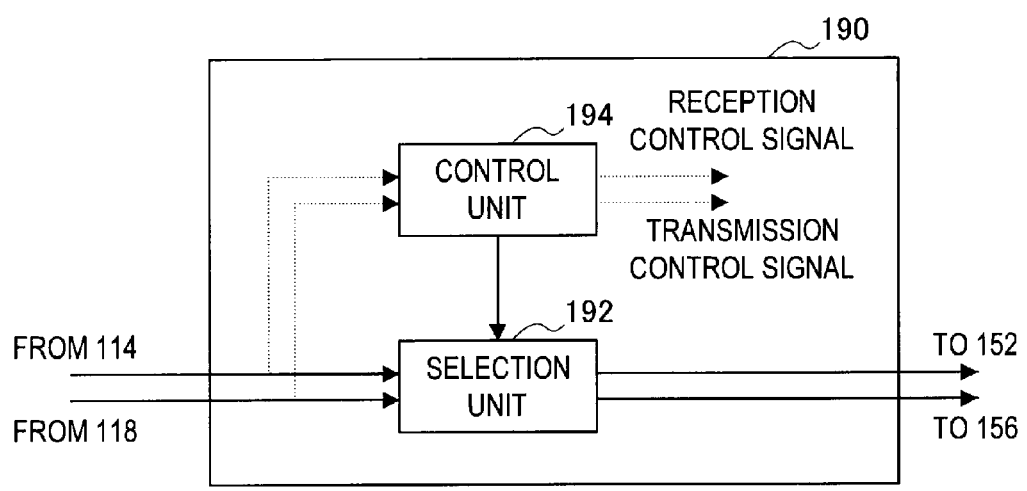
FIG. 9 is a block diagram showing an example of the concrete configuration of a communication control unit of the relay station according to an embodiment.

FIG. 9 is a block diagram showing an example of the concrete configuration of the communication control unit 190 of the relay station 100 shown in FIG. 5. Referring to FIG. 9, the communication control unit 190 contains a selection unit 192 and a control unit 194.

The selection unit 192 has a role as a buffer to temporarily store data contained in a radio signal received by the first receiving unit 114 or the second receiving unit 118 by using a storage medium such as a RAM (Random Access Memory). Further, the selection unit 192 also has a role as a selector to output temporarily stored data to the first transmitting unit 152 and the second transmitting unit 156 in accordance with the control from the control unit 194.

The communication control unit 190, on the other hand, controls overall functions of the relay station 100 by using a processing apparatus such as a CPU (Central Processing Unit) and DSP (Digital Signal Processor). For example, the communication control unit 190 recognizes the modulation and/or multiplexing method that can be used for reception or transmission of a radio signal from information contained in the control channel shown in FIG. 2. The communication control unit 190 selects the modulation and/or multiplexing method used for reception of a radio signal by the first receiving unit 114 or the second receiving unit 118 at least from the first modulation and/or multiplexing method and the second modulation and/or multiplexing method. Then, the communication control unit 190 outputs a reception control signal to the first receiving unit 114 and/or the second receiving unit 118 to cause the first receiving unit 114 and/or the second receiving unit 118 to receive a desired radio signal by using the selected modulation and/or multiplexing method. Further (or instead), the communication control unit 190 selects the modulation and/or multiplexing method used for transmission of a radio signal by the first transmitting unit 152 or the second transmitting unit 156 at least from the first modulation and/or multiplexing method and the second modulation and/or multiplexing method. Then, the communication control unit 190 outputs a transmission control signal to the first transmitting unit 152 and/or the second transmitting unit 156 to cause the first transmitting unit 152 and/or the second transmitting unit 156 to transmit a radio signal by using the selected modulation and/or multiplexing method.

(Form of Relay Processing)

Figure 10B:
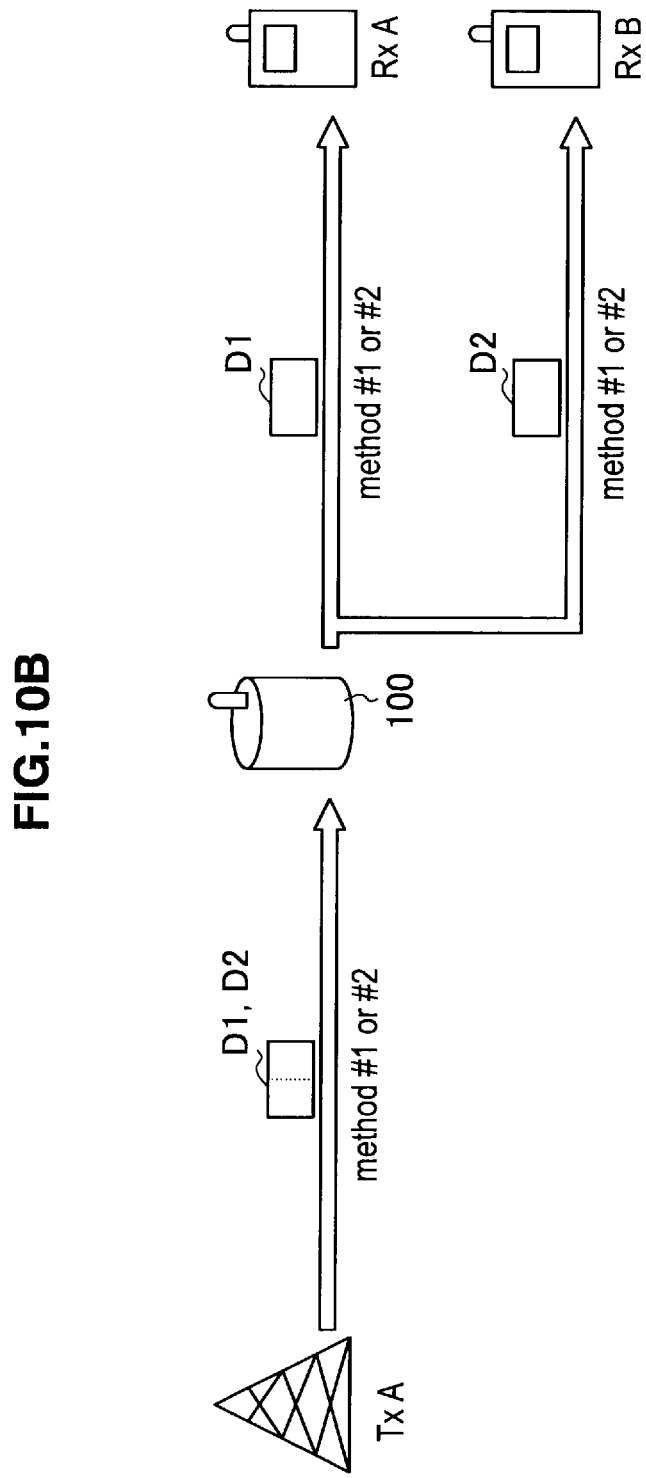
FIG. 10B is an explanatory view illustrating a form in which one or more destinations are present.

In the relation between a source node and a destination node for relay communication, the numbers of nodes are not necessarily one-to-one. That is, the communication control unit 190 may cause the first transmitting unit 152 and/or the second transmitting unit 156 to transmit received data from one source node to two or more destination nodes. Alternatively, the communication control unit 190 may cause the first transmitting unit 152 and/or the second transmitting unit 156 to transmit one piece of data obtained by integrating data received from two or more source nodes to one destination node. FIGS. 10A to 10C are explanatory views illustrating each form of such relay processing.

In the example in FIG. 10A, the relation between the source node and destination node is one-to-one. That is, the relay station 100 first receives data D1 from a source node TxA by using the first modulation and/or multiplexing method or the second modulation and/or multiplexing method. Then, the relay station 100 transmits the data D1 to a destination node RxA by using the first modulation and/or multiplexing method or the second modulation and/or multiplexing method. The modulation and/or multiplexing method used for transmission to the destination node RxA may be the same as or different from that used for reception from the source node TxA.

In the example in FIG. 10B, the relation between the source node and destination node is one-to-many (one-to-two in FIG. 10B). That is, the relay station 100 first receives data D1 and D2 from a source node TxA by using the first modulation and/or multiplexing method or the second modulation and/or multiplexing method. It is assumed here that the destination of the data D1 is a destination node RxA and that of the data D2 is a destination node RxB. Then, the relay station 100 transmits the data D1 to the destination node RxA by using the first modulation and/or multiplexing method or the second modulation and/or multiplexing method. The relay station 100 transmits the data D2 to the destination node RxB by using the first modulation and/or multiplexing method or the second modulation and/or multiplexing method.

In the example in FIG. 10C, the relation between the source node and destination node is many-to-one (two-to-one in FIG. 10C). That is, the relay station 100 first receives data D1 from a source node TxA by using the first modulation and/or multiplexing method or the second modulation and/or multiplexing method. The relay station 100 also receives data D2 from a source node TxB by using the first modulation and/or multiplexing method or the second modulation and/or multiplexing method. It is assumed here that the destination of the data D1 and that of the data D2 are both a destination node RxA. It is also assumed, for example, that link quality between the relay station 100 and the destination node RxA is better than that between the source node TxA or TxB and the relay station 100. Then, the relay station 100 modulates the data D1 and the data D2 into common symbols by using a higher-order modulation method and transmits the common symbols to the destination node RxA by using the first modulation and/or multiplexing method or the second modulation and/or multiplexing method.

(Selection Processing)

A selection of the modulation and/or multiplexing method for relaying by the communication control unit 190 is typically made based on the type of link to the source node or destination node, quality of each link, or a type of data contained in a radio signal. For example, the communication control unit 190 may select the modulation and/or multiplexing method used for relaying based on whether the link to the destination node is an uplink or downlink. Alternatively, for example, the communication control unit 190 may select the modulation and/or multiplexing method used for relaying based on whether the link to the destination node is a backhaul or relay link or access link described by using FIG. 4.

FIG. 11 is a table illustrating an example of a selection standard in the communication control unit 190 for selecting the modulation and/or multiplexing method used for relay communication. Referring to FIG. 11, the communication control unit 190 selects the SC-FDMA method as the multiplexing method if the link type is an access link and the direction thereof is an uplink (that is, when receiving from a mobile station). The communication control unit 190 selects the OFDMA method if the link type is an access link and the direction thereof is a downlink (that is, when transmitting to a mobile station). If the link type is a backhaul or relay link (that is, when receiving from a base station or transmitting to a base station), the communication control unit 190 can select from the OFDMA method and the SC-FDMA method regardless of the direction thereof. According to such a selection standard, if, for example, the functionality of a mobile station supports only the OFDMA method for transmission of an uplink signal and the SC-FDMA method for reception of a downlink signal, a multiplexing method supported by the mobile station can appropriately be selected.

Further, if link quality is better than a predefined predetermined threshold, the communication control unit 190 may select a modulation and/or multiplexing method having a higher data rate. If, for example, the multiplexing method is one of the OFDMA method and the SC-FDMA method, a higher data rate can be achieved by selecting a higher-order modulation method for modulation. If, like the backhaul or relay link in FIG. 11, one of the OFDMA method and the SC-FDMA method can be selected, it is suitable to select the OFDMA method having a high affinity for MIMO as long as no severe transmission power restrictions are imposed on the link (that is, use of relatively high transmission power is permitted).

Further, the communication control unit 190 may select the modulation and/or multiplexing method used for relay based on the type of data contained in a radio signal. For example, in the case of data for a real-time application for which low latency is demanded, the time necessary for relay processing can be reduced by selecting the same modulation and/or multiplexing method as that for reception. Whether or not data contained in a radio signal is data for a real-time application can be identified, in the case of LTE, for example, by referring to QCI (QoS Class Identifier) information acquired via the control channel.

Figure 12:
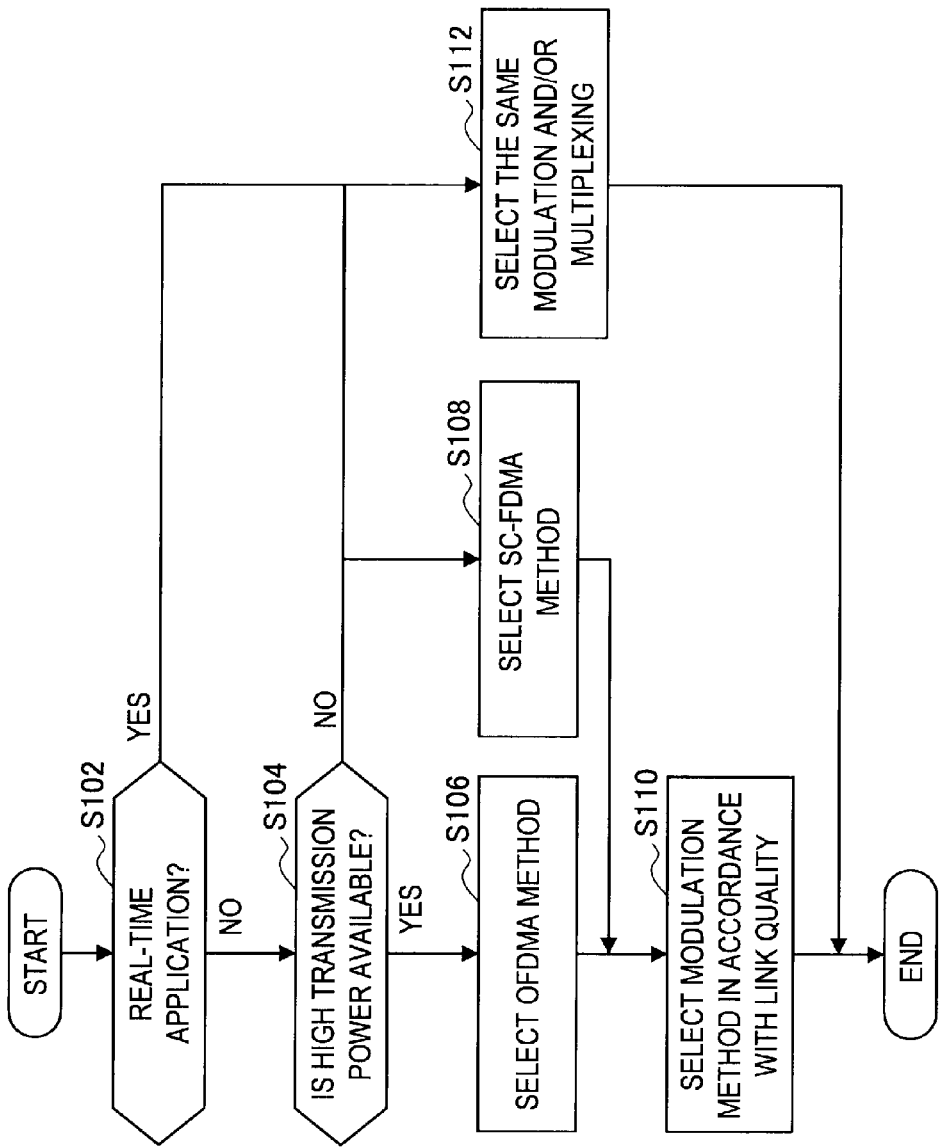
FIG. 12 is a flow chart showing an example of the flow of selection processing of the modulation and/or multiplexing method used for relay.

FIG. 12 is a flow chart showing an example of the flow of selection processing of the modulation and/or multiplexing method by the communication control unit 190.

Referring to FIG. 12, the communication control unit 190 first determines whether or not data contained in a radio signal is data for a real-time application (step S102). If the data is data for a real-time application, the processing proceeds to step S112 to select the same modulation and/or multiplexing method for reception and transmission. If, on the other hand, the data is not data for a real-time application, the processing proceeds to step S104.

Next, the communication control unit 190 determines whether or not use of high transmission power is permitted for the link to be selected (step S104). If use of high transmission power is permitted, the OFDMA method is selected as the multiplexing method (step S106). If, on the other hand, use of high transmission power is not permitted, the SC-FDMA method is selected as the multiplexing method (step S108).

Next, the communication control unit 190 selects the modulation method in accordance with link quality of the link to be selected (step S110). If, for example, link quality of a link to a destination node is better than that of a link to a source node, the communication control unit 190 may select a higher-order modulation method than a modulation method for reception as a modulation method for transmission. If, instead, link quality of a link to a destination node is worse than that of a link to a source node, the communication control unit 190 may select a lower-order modulation method than a modulation method for reception as a modulation method for transmission.

By using the modulation and/or multiplexing method selected as a result of such selection processing, the communication control unit 190 causes the first communication unit 110 and/or the second communication unit 150 to receive a radio signal from a source node and to transmit a radio signal to a destination node.

(Retransmission Control)

Further, if an error is detected when the first receiving unit 114 or the second receiving unit 118 demodulates/decodes a reception signal, the communication control unit 190 may request the retransmission of data in which an error was detected from the source node without allowing the signal to be relayed.

Figure 13:
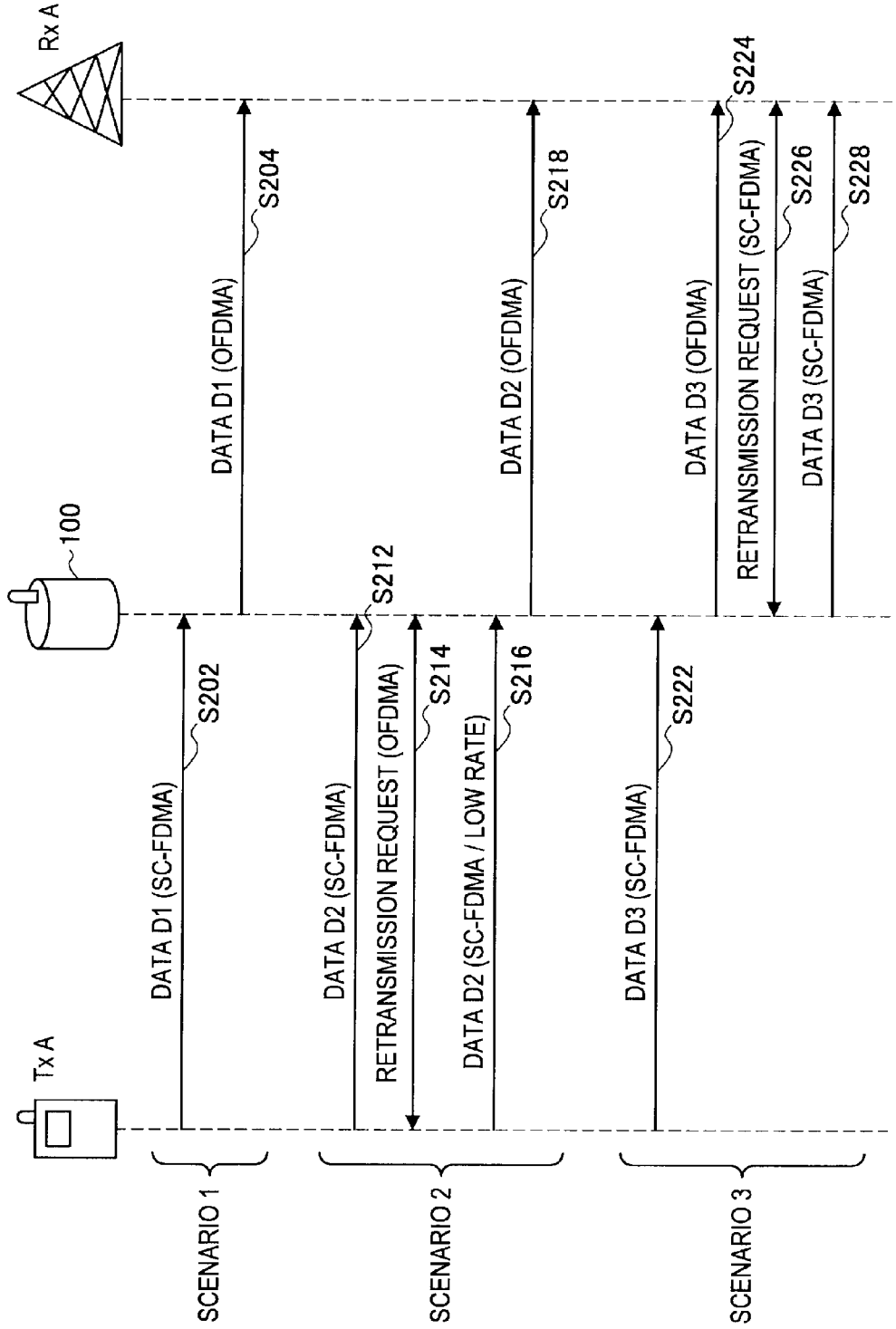
FIG. 13 is an explanatory view illustrating retransmission control by the relay station according to an embodiment.

FIG. 13 is an explanatory view illustrating retransmission control by the communication control unit 190 of the relay station 100. Here, an example in which the source node TxA is a mobile station and the destination node RxA is a base station is shown as an example. Referring to FIG. 13, three scenarios are illustrated: a first scenario (scenario 1) in which no data retransmission occurs and a second scenario (scenario 2) and a third scenario (scenario 3) in which data retransmission occurs.

In the first scenario, the relay station 100 first receives data D1 from the source node TxA by using the SC-FDMA method (step S202). Next, the relay station 100 transmits the data D1 to the destination node RxA by using, for example, the OFDMA method (step S204). Thus, if no error occurs during data transmission, relay communication by the relay station 100 is completed by two steps.

In the second scenario, the relay station 100 first receives data D2 from the source node TxA by using the SC-FDMA method (step S212). Assume here that an error is detected when a reception signal is demodulated/decoded in the relay station 100. In such a case, the relay station 100 transmits a retransmission request of the data D2 to the source node TxA by using, for example, the OFDMA method (step S214). Then, the data D2 is retransmitted at a lower rate (higher reliability) from the source node TxA by using, for example, the SC-FDMA method (step S216). Then, the relay station 100 transmits the data D2 to the destination node RxA by using, for example, the OFDMA method (step S218). Thus, if an error is detected when the relay station 100 demodulates/decodes a reception signal, communication resources consumed for retransmission control can be saved by requesting the retransmission of data from the source node without relaying the signal.

In the third scenario, the relay station 100 first receives data D3 from the source node TxA by using the SC-FDMA method (step S222). Next, the relay station 100 transmits the data D3 to the destination node RxA by using, for example, the OFDMA method (step S224). Assume here that an error is detected when a reception signal is demodulated/decoded in the destination node RxA. In such a case, the destination node RxA transmits a retransmission request of the data D3 to the relay station 100 by using, for example, the SC-FDMA method (step S226). Then, the relay station 100 retransmits the data D3 by using, for example, the SC-FDMA method (step S228). Also in this scenario, like the second scenario, communication resources consumed for retransmission control are saved. Moreover, according to the present embodiment, like the second and third scenarios, a modulation and/or multiplexing method different from the method used for receiving a signal can be used for a retransmission request and thus, reliability of data retransmission can be increased.

3. EXAMPLE OF SCHEDULING PROCESSING

Generally, in a radio communication system adopting a cellular communication method, communication resources are assigned by a base station that manages cells (or a network controller connected to a plurality of base stations) based on a request of permission of data communication from a mobile station. A sequence of processing including a request of permission of data communication from a mobile station, assignment of communication resources by a base station, and a notification of assignment of communication resources from the base station to the mobile station is herein called scheduling processing. If a relay station is located between a mobile station and a base station, the relay station can receive a scheduling request transmitted from the mobile station or scheduling information delivered from the base station to plan which modulation and/or multiplexing method to use for which communication by referring to the request or the information.

Before a scheduling is executed, the base station (or the network controller) may collect information about link quality between the relay station and mobile station from the relay station or the mobile station in advance. Similarly, the base station (or the network controller) may collect information about link quality between the base station and relay station from the relay station in advance. Accordingly, for example, it becomes possible to decide the modulation and/or multiplexing method to be used and assign communication resources in a unified manner by the base station or the like. In such a case, the relay station receives, for example, information specifying the modulation and/or multiplexing method to be used for relay communication from the base station. Such information may be, for example, a portion of scheduling information (information about integration or separation of communication resources for relay can be contained). Then, the relay station performs relay communication using the modulation and/or multiplexing method selected according to the information received from the base station.

Figure 14:
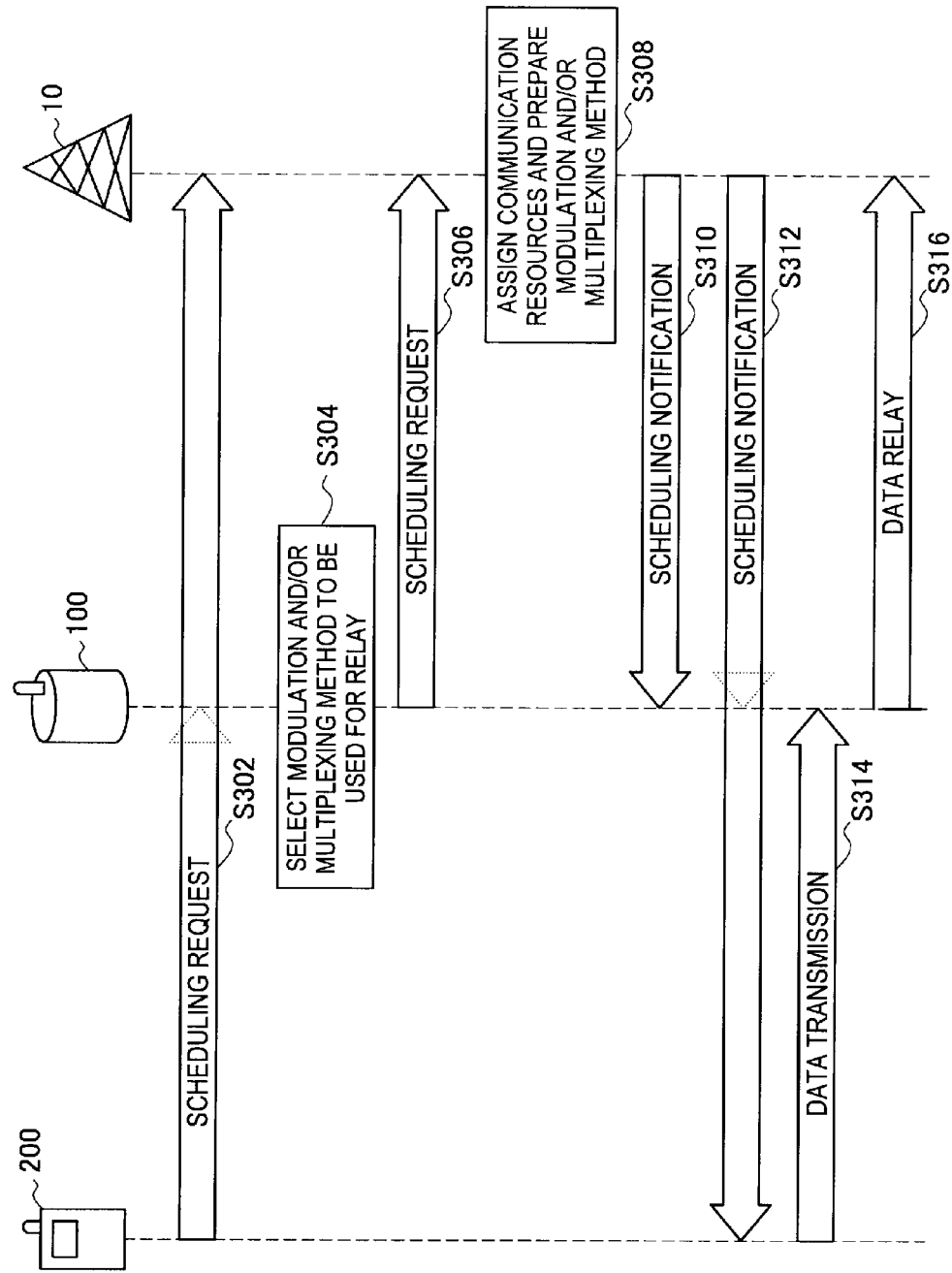
FIG. 14 is an explanatory view illustrating the flow of scheduling processing in the radio communication system according to an embodiment.

FIG. 14 is an explanatory view illustrating an example of the flow of scheduling processing in the radio communication system 1. Here, an example in which the modulation and/or multiplexing method to be used for relay communication is decided by the relay station 100 will be described. Referring to FIG. 14, the mobile station 200 first transmits a scheduling request to the base station 10 (step S302). The request is relayed, for example, by the relay station 100 to the base station 10. Moreover, the relay station 100 knows that the mobile station 200 wants to transmit data from reception of the scheduling request in step S302. Then, the relay station 100 selects the modulation and/or multiplexing method to be used for relay communication based on, for example, the type of each communication link between the mobile station 200 and the base station 10, quality of each link, or the type of data to be transmitted (step S304).

Then, the relay station 100 requests to the base station 10 assignment of communication resources for relaying data from the mobile station 200 (step S306). At this point, the relay station 100 transmits information specifying the modulation and/or multiplexing method selected for relay communication together to the base station 10. Then, the base station 10 assigns communication resources to each of data communication by the mobile station 200 and relay communication by the relay station 100. The base station 10 also makes preparations to use the modulation and/or multiplexing method specified by the relay station 100 in step S306 for reception of data relayed from the relay station 100 (step S308).

Next, the base station 10 transmits scheduling information for notification of an assignment result of communication resources to the relay station 100 and the mobile station 200 inside the cell. The relay station 100 receives the scheduling information (step S310). The base station 10 may determine whether to permit the modulation and/or multiplexing method specified in step S308. Then, if the specified modulation and/or multiplexing method is not permitted, in step S310, a notification indicating that the specified modulation and/or multiplexing method is not permitted may be transmitted from the base station 10 to the relay station 100.

Further, the mobile station 200 receives scheduling information relayed from the relay station 100 (step S312). Then, the relay station 100 receives data from the mobile station 200 by using the modulation and/or multiplexing method selected in step S304 (step S314). Then, the relay station 100 relays the data received from the mobile station 200 to the base station 10 by using the modulation and/or multiplexing method selected in step S304 (or another method if the relevant modulation and/or multiplexing method is not permitted) (step S316).

4. CONFIGURATION OF MOBILE STATION

Heretofore, the radio communication system 1 according to the present embodiment has concretely been described particularly focusing on the configuration of the relay station 100 by using FIGS. 1 to 14. Note that, the mobile station 200 may support only one modulation and/or multiplexing method for reception and one modulation and/or multiplexing method for transmission, instead of supporting the first modulation and/or multiplexing method and the second modulation and/or multiplexing method for both reception and transmission like the relay station 100.

5. CONCLUSION

According to the relay station 100 in the present embodiment described herein, the modulation and/or multiplexing method used for receiving a radio signal from a source or the modulation and/or multiplexing method used for transmitting a radio signal to a destination can adaptively be selected based on the type of link to the source or destination of a radio signal, quality of each link, or the type of data contained in a radio signal. Accordingly, for example, improvement of link quality, reduction of power consumption, or improvement of performance such as the data rate can be achieved depending on the condition of each link.

If the first modulation and/or multiplexing method supports the OFDMA method and the second modulation and/or multiplexing method supports the SC-FDMA method, a portion of a receiving circuit or a transmitting circuit can be shared by the two methods. Accordingly, it becomes possible to downsize the circuit, reduce power consumption involved therein, and reduce manufacturing costs thereof.

According to the relay station 100, radio signals can be received from a plurality of sources by using different modulation and/or multiplexing methods or radio signals can be transmitted to a plurality of destinations by using different modulation and/or multiplexing methods. Thus, for example, relay communication and other types of communication can be mixed, so that networks of various topologies such as a mesh network can flexibly be constructed.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-229480 filed in the Japan Patent Office on Oct. 1, 2009, the entire content of which is hereby incorporated by reference.

REFERENCE SIGNS LIST

10 Base station
100 Relay station
110 First communication unit
114 First receiving unit
152 First transmitting unit
150 Second communication unit
118 Second receiving unit
156 Second transmitting unit
190 Communication control unit
192 Selection unit
194 Control unit
200 Mobile station

The invention claimed is:

1. A relay node in a mobile communication network for relaying communications between a base station and a mobile terminal, the relay node comprising:
   circuitry configured to:
   communicate with the base station via a backhaul link using a first combination of a first modulation method and a first multiplexing method;
   communicate with the mobile terminal via an access link using a second combination of a second modulation method and a second multiplexing method; and
   select either Single Carrier-Frequency Division Multiple Access (SC-FDMA) or Orthogonal Frequency Division Multiple Access (OFDMA) as the first combination and the second combination based on whether the communication is via the backhaul link with the base station or the access link with the mobile terminal, and whether the communication is an uplink connection or a downlink connection, wherein
   the circuitry is configured to select the OFDMA as the first combination when the circuitry determines a high transmission power is available for the communication via the backhaul link with the base station, or select the OFDMA as the second combination when the circuitry determines the high transmission power is available for the communication via the access link with the mobile terminal,
   the circuitry is configured to select the SC-FDMA as the first combination when the circuitry determines the high transmission power is not available for the communication via the backhaul link with the base station, or select the SC-FDMA as the second combination when the circuitry determines the high transmission power is not available for the communication via the access link with the mobile terminal, and
   the circuitry is configured to select either the SC-FDMA or the OFDMA for both of the uplink connection and the downlink connection when the circuitry determines data included in the communications is for a real-time application.

2. The relay node according to claim 1, wherein
the circuitry is configured to select the SC-FDMA for the communication via the access link with the mobile terminal in the uplink communication, select the OFDMA for the communication via the access link with the mobile terminal in the downlink communication, select either the SC-FDMA or the OFDMA for the communication via the backhaul link with the base station in the uplink communication, and select either the SC-FDMA or the OFDMA for the communication via the backhaul link with the base station in the downlink communication.

3. The relay node according to claim 2, wherein
the circuitry is configured to select the OFDMA for the communication via the backhaul link with the base station in the uplink communication.

4. The relay node according to claim 2, wherein
the circuitry is configured to select the SC-FDMA for the communication via the backhaul link with the base station in the downlink communication.

5. The relay node according to claim 2, wherein
the circuitry is configured to select either the SC-FDMA for the communication via the backhaul link with the base station in the uplink communication, and select the OFDMA for the communication via the backhaul link with the base station in the downlink communication.

6. A non-transitory computer-readable medium including executable instructions, which when executed by a relay node, cause the relay node to perform a method of relaying communications between a base station and a mobile terminal, the method comprising:
   selecting a first combination of a first modulation method and a first multiplexing method for communicating with the base station via a backhaul link;

selecting a second combination of a second modulation method and a second multiplexing method for communicating with the mobile terminal via an access link;

communicating with the base station via the backhaul link using the at least one of the first modulation method and the first multiplexing method;

communicating with the mobile terminal via the at least one of the second modulation method and the second multiplexing method;

selecting either Single Carrier-Frequency Division Multiple Access (SC-FDMA) or Orthogonal Frequency Division Multiple Access (OFDMA) as the first combination and the second combination based on whether the communication is via the backhaul link with the base station or the access link with the mobile terminal, and whether the communication is an uplink connection or a downlink connection;

selecting the OFDMA as the first combination when a high transmission power is determined to be available for the communication via the backhaul link with the base station, or selecting the OFDMA as the second combination when the high transmission power is determined to be available for the communication via the access link with the mobile terminal;

selecting the SC-FDMA as the first combination when the high transmission power is determined to be not available for the communication via the backhaul link with the base station, or selecting the SC-FDMA as the second combination when the high transmission power is determined to be not available for the communication via the access link with the mobile terminal; and selecting either the SC-FDMA or the OFDMA for both of the uplink connection and the downlink connection when data included in the communications is determined to be for a real-time application.

7. A method performed by a relay node of relaying communications between a base station and a mobile terminal, the method comprising:

selecting, by circuitry of the relay node, a first combination of a first modulation method and a first multiplexing method for communicating with the base station via a backhaul link;

selecting, by the circuitry of the relay node, a second combination of a second modulation method and a second multiplexing method for communicating with the mobile terminal via an access link;

communicating, by the circuitry of the relay node, with the base station via the backhaul link using the at least one of the first modulation method and the first multiplexing method;

communicating, by the circuitry of the relay node, with the mobile terminal via the access link using the at least one of the second modulation method and the second multiplexing method;

selecting, by the circuitry of the relay node, either Single Carrier-Frequency Division Multiple Access (SC-FDMA) or Orthogonal Frequency Division Multiple Access (OFDMA) as the first combination and the second combination based on whether the communication is via the backhaul link with the base station or the access link with the mobile terminal, and whether the communication is an uplink connection or a downlink connection;

selecting, by the circuitry of the relay node, the OFDMA as the first combination when a high transmission power is determined to be available for the communication via the backhaul link with the base station, or selecting, by the circuitry of the relay node, the OFDMA as the second combination when the high transmission power is determined to be available for the communication via the access link with the mobile terminal;

selecting, by the circuitry of the relay node, the SC-FDMA as the first combination when the high transmission power is determined to be not available for the communication via the backhaul link with the base station, or selecting, by the circuitry of the relay node, the SC-FDMA as the second combination when the high transmission power is determined to be not available for the communication via the access link with the mobile terminal; and selecting either the SC-FDMA or the OFDMA for both of the uplink connection and the downlink connection when data included in the communications is determined to be for a real-time application.

8. A wireless communication system, comprising:

a base station;

a relay node configured to relay communications between the base station and a mobile terminal; and circuitry configured to:

select a first combination of a first modulation method and a first multiplexing method for communication between the relay node and the base station via a backhaul link;

select a second combination of a second modulation method and a second multiplexing method for communication between the relay node and the mobile terminal via an access link;

at the relay node, communicate with the base station via the backhaul link using the at least one of the first modulation method and the first multiplexing method;

at the relay node, communicate with the mobile terminal via the access link using the at least one of the second modulation method and the second multiplexing method;

select either Single Carrier-Frequency Division Multiple Access (SC-FDMA) or Orthogonal Frequency Division Multiple Access (OFDMA) as the first combination and the second combination based on whether the communication is via the backhaul link with the base station or the access link with the mobile terminal, and whether the communication is an uplink connection or a downlink connection, wherein the circuitry is configured to select the OFDMA as the first combination when the circuitry determines a high transmission power is available for the communication via the backhaul link with the base station, or select the OFDMA as the second combination when the circuitry determines the high transmission power is available for the communication via the access link with the mobile terminal, the circuitry is configured to select the SC-FDMA as the first combination when the circuitry determines the high transmission power is not available for the communication via the backhaul link with the base station, or select the SC-FDMA as the second combination when the circuitry determines the high transmission power is not available for the communication via the access link with the mobile terminal, and the circuitry is configured to select either the SC-FDMA or the OFDMA for both of the uplink connection and the downlink connection when the circuitry determines data included in the communications is for a real-time application.

9. A mobile terminal in a mobile communication network for receiving communications relayed from a base station to the mobile terminal via a relay node, the mobile terminal comprising:
- a communication interface configured to receive data from the relay node via an access link using a first combination of a first modulation method and a first multiplexing method, which are selected by the relay node, wherein the data transmitted from the relay node to the mobile terminal is received at the relay node via a backhaul link using a second combination of a second modulation method and a second multiplexing method,
- wherein either Single Carrier-Frequency Division Multiple Access (SC-FDMA) or Orthogonal Frequency Division Multiple Access (OFDMA) is selected as the first combination and the second combination based on whether the communication is via the backhaul link with the base station or the access link with the mobile terminal, and whether the communication is an uplink connection or a downlink connection,
- the OFDMA is selected as the first combination when a high transmission power is determined to be available for the communication via the backhaul link with the base station, or the OFDMA is selected as the second combination when the high transmission power is determined to be available for the communication via the access link with the mobile terminal,
- the SC-FDMA is selected as the first combination when the high transmission power is determined to be not available for the communication via the backhaul link with the base station, or the SC-FDMA is selected as the second combination when the high transmission power is determined to be not available for the communication via the access link with the mobile terminal, and
- either the SC-FDMA or the OFDMA for both of the uplink connection and the downlink connection is selected when data included in the communications is determined to be for a real-time application.

* * * * *